United States Patent
Sun et al.

(10) Patent No.: US 12,198,374 B2
(45) Date of Patent: Jan. 14, 2025

(54) METHOD FOR TRAINING SMPL PARAMETER PREDICTION MODEL, COMPUTER DEVICE, AND STORAGE MEDIUM

(71) Applicant: Tencent Technology (Shenzhen) Company Limited, Shenzhen (CN)

(72) Inventors: Shuang Sun, Shenzhen (CN); Chen Li, Shenzhen (CN); Yuwing Tai, Shenzhen (CN); Jiaya Jia, Shenzhen (CN); Xiaoyong Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 945 days.

(21) Appl. No.: 17/231,952

(22) Filed: Apr. 15, 2021

(65) Prior Publication Data
US 2021/0232924 A1    Jul. 29, 2021

Related U.S. Application Data

(63) Continuation of application No. PCT/CN2020/072023, filed on Jan. 14, 2020.

(30) Foreign Application Priority Data

Feb. 1, 2019 (CN) .......................... 201910103414.X

(51) Int. Cl.
*G06T 7/73* (2017.01)
*G06F 18/22* (2023.01)
(Continued)

(52) U.S. Cl.
CPC ............... *G06T 7/74* (2017.01); *G06F 18/22* (2023.01); *G06N 3/08* (2013.01); *G06T 7/70* (2017.01);
(Continued)

(58) Field of Classification Search
None
See application file for complete search history.

(56) References Cited

U.S. PATENT DOCUMENTS 10,529,137 B1 *   1/2020   Black .................... G06T 15/04
10,679,046 B1 *   6/2020   Black .................... G06V 40/23
(Continued)

FOREIGN PATENT DOCUMENTS

| CN | 108594997 A | 9/2018 |
| CN | 109285215 A | 1/2019 |
| CN | 109859296 A | 6/2019 |

OTHER PUBLICATIONS

Bogo et al., "Keep It SMPL: Automatic Estimation of 3D Human Pose and Shape from a Single Image," B. Leibe et al. (Eds.): ECCV 2016, Part V, LNCS 9909, pp. 561-578, 2016 (Year: 2016).*
(Continued)

*Primary Examiner* — Soo Shin
(74) *Attorney, Agent, or Firm* — Morgan, Lewis & Bockius LLP

(57) ABSTRACT

A method for training an SMPL parameter prediction model, including: obtaining a sample picture; inputting the sample picture into a pose parameter prediction model to obtain a predicted pose parameter; inputting the sample picture into a shape parameter prediction model to obtain a predicted shape parameter; calculating model prediction losses according to an SMPL parameter prediction model and annotation information of the sample picture; and updating the pose parameter prediction model and the shape parameter prediction model according to the model prediction losses.

19 Claims, 9 Drawing Sheets

(51) Int. Cl.
  *G06N 3/08*    (2023.01)
  *G06T 7/70*    (2017.01)
  *G06T 17/00*   (2006.01)
  *G06V 10/80*   (2022.01)
  *G06V 10/82*   (2022.01)
  *G06V 40/10*   (2022.01)

(52) U.S. Cl.
  CPC ............ *G06T 17/00* (2013.01); *G06V 10/809* (2022.01); *G06V 10/82* (2022.01); *G06V 40/11* (2022.01); *G06T 2207/20044* (2013.01)

(56) References Cited

U.S. PATENT DOCUMENTS

| | | | |
|---|---|---|---|
| 11,302,064 B2* | 4/2022 | Li | G06T 7/50 |
| 2018/0315230 A1* | 11/2018 | Black | G06T 17/00 |
| 2019/0371080 A1* | 12/2019 | Sminchisescu | G06T 17/20 |
| 2021/0241522 A1* | 8/2021 | Guler | G06V 40/103 |

OTHER PUBLICATIONS

Pengfei Dou et al. "End-to-End 3D Face Reconstruction with Deep Neural Networks," 2017 IEEE International Conference on Computer Vision, University of Houston Computational Biomedicine Lab, Nov. 9, 2017, 10 pgs.

Tencent Technology, ISR, PCT/CN2020/072023, Apr. 3, 2020, 2 pgs.

Extended European Search Report, EP20748016.1, Sep. 19, 2022, 8 pgs.

Meysam Madadi et al., "SMPLR: Deep SMPL Reverse for 3D Human Pose and Shape Recovery", arxiv.org, Cornell University Library, Dec. 27, 2018, XP081457828, 11 pgs.

Christoph Lassner et al., "Unite the People: Closing the Loop Between 3D and 2D Human Representations", arxiv.org, Cornell University Library, Jan. 10, 2017, XP080740529, 10 pgs.

Federica Bogo et al., "Keep It SMPL Automatic Estimation of 3D Human Pose and Shape from a Single Image", Sep. 16, 2016, Advances in Biometrics: International Conference, ICB 2007, XP047355099, 2 pgs., Retrieved from the Internet: https://arxiv.org/abs/1607.08128.

Ernesto Brau et al., "3D Human Pose Estimation via Deep Learning from 2D Annotations", 2016 Fourth International Conference on 3D Vision (3DV), IEEE, Oct. 25, 2016, XP033027667, 3 pgs., Retrieved from the Internet: https://ieeexplore.iece.org/document/7785134.

Georgios Pavlakos et al., "Learning to Estimate 3D Human Pose and Shape from a Single Color Image", 2018 IEEE/CVF Conference on Computer Vision and Pattern Recognition, IEEE, Jun. 18, 2018, XP033476006, 2 pgs., Retrieved from the Internet: https://arxiv.org/abs/1805.04092.

Tencent Technology, WO, PCT/CN2020/072023, Apr. 3, 2020, 5 pgs.

Tencent Technology, IPRP, PCT/CN2020/072023, Jul. 27, 2021, 6 pgs.

\* cited by examiner

METHOD FOR TRAINING SMPL PARAMETER PREDICTION MODEL, COMPUTER DEVICE, AND STORAGE MEDIUM

CROSS-REFERENCE TO RELATED APPLICATIONS

This application is a continuation application of PCT Patent Application No. PCT/CN2020/072023, entitled "METHOD FOR TRAINING SMPL PARAMETER PREDICTION MODEL, SERVER, AND STORAGE MEDIUM" filed on Jan. 14, 2020, which claims priority to Chinese Patent Application No. 201910103414.X, entitled "METHOD FOR TRAINING SMPL PARAMETER PREDICTION MODEL, SERVER, AND STORAGE MEDIUM" and filed with the State Intellectual Property Office of the People's Republic of China, on Feb. 1, 2019, all of which are incorporated herein by reference in their entirety.

FIELD OF THE TECHNOLOGY

Embodiments of this application relate to the field of computer vision, and in particular, to a method for training an SMPL parameter prediction model, a computer device, and a storage medium.

BACKGROUND OF THE APPLICATION

Three-dimensional human body reconstruction is an important topic in the computer vision research and is of great value in application in the fields such as virtual reality (VR), human body animation, and games.

In related technologies, a skinned multi-person linear (SMPL) model is used to perform three-dimensional human body reconstruction for a human body in a two-dimensional image. In a three-dimensional human body reconstruction method, human body information such as two-dimensional joints, three-dimensional joints, a two-dimensional human body segmentation map, and three-dimensional voxels of a human body in a two-dimensional image is extracted using a human body information extraction model; then the extracted human body information is inputted into a parameter prediction model for SMPL parameter prediction; and SMPL parameters obtained by prediction are inputted into an SMPL model for three-dimensional human body reconstruction.

However, such a method requires training the human body information extraction model and the parameter prediction model separately before three-dimensional human body reconstruction and then performing joint training on the trained models, which results in a complex model training process and takes much time.

SUMMARY

According to embodiments provided in this application, a method for training an SMPL parameter prediction model, a computer device, and a storage medium are provided. The technical solutions are as follows:

According to a first aspect, the embodiments of this application provide a method for training an SMPL parameter prediction model, performed by a computer device, the method including:

obtaining a sample picture, the sample picture containing a human body image;

inputting the sample picture into a pose parameter prediction model to obtain a predicted pose parameter, the predicted pose parameter being a parameter used for indicating a human body pose in the SMPL parameter prediction model;

inputting the sample picture into a shape parameter prediction model to obtain a predicted shape parameter, the predicted shape parameter being a parameter used for indicating a human body shape in the SMPL parameter prediction model;

calculating model prediction losses according to the SMPL parameter prediction model and annotation information of the sample picture; and updating the pose parameter prediction model and the shape parameter prediction model according to the model prediction losses.

According to another aspect, the embodiments of this application provide a three-dimensional human body reconstruction method, performed by a computer device, the method including:

obtaining a target picture, the target picture containing a human body image;

inputting the target picture into the updated pose parameter prediction model to obtain a predicted pose parameter;

inputting the target picture into the updated shape parameter prediction model to obtain a predicted shape parameter; and constructing a target three-dimensional human body model according to the predicted pose parameter and the predicted shape parameter.

According to another aspect, the embodiments of this application provide an apparatus for training an SMPL parameter prediction model, the apparatus including:

a first obtaining module, configured to obtain a sample picture, the sample picture containing a human body image;

a first prediction module, configured to input the sample picture into a pose parameter prediction model to obtain a predicted pose parameter, the predicted pose parameter being a parameter used for indicating a human body pose in the SMPL parameter prediction model;

a second prediction module, configured to input the sample picture into a shape parameter prediction model to obtain a predicted shape parameter, the predicted shape parameter being a parameter used for indicating a human body shape in the SMPL parameter prediction model;

a loss calculation module, configured to calculate model prediction losses according to the SMPL parameter prediction model and annotation information of the sample picture; and a training module, configured to update the pose parameter prediction model and the shape parameter prediction model according to the model prediction losses.

According to another aspect, the embodiments of this application provide a three-dimensional human body reconstruction apparatus, the apparatus including:

a second obtaining module, configured to obtain a target picture, the target picture containing a human body image;

a third prediction module, configured to input the target picture into the updated pose parameter prediction model to obtain a predicted pose parameter;

a fourth prediction module, configured to input the target picture into the updated shape parameter prediction model to obtain a predicted shape parameter; and a second construction module, configured to construct a target three-dimensional human body model according to the predicted pose parameter and the predicted shape parameter.

According to another aspect, the embodiments of this application provide a computer device, including a processor and a memory, the memory storing computer-readable instructions, the computer-readable instructions, when executed by the processor, causing the processor to perform the steps of the method for training an SMPL parameter prediction model or the three-dimensional human body reconstruction method.

According to another aspect, the embodiments of this application provide a non-transitory computer-readable storage medium, storing computer-readable instructions, the computer-readable instructions, when executed by one or more processors, causing the one or more processors to perform the method for training an SMPL parameter prediction model or the three-dimensional human body reconstruction method according to the foregoing aspect.

Details of one or more embodiments of this application are provided in the drawings and descriptions below. Other features, objectives, and advantages of this application become apparent from the specification, the drawings, and the claims.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following descriptions show only some embodiments of this application, and a person of ordinary skill in the art may still derive other accompanying drawings from the accompanying drawings without creative efforts.

DESCRIPTION OF EMBODIMENTS

Figure 1:
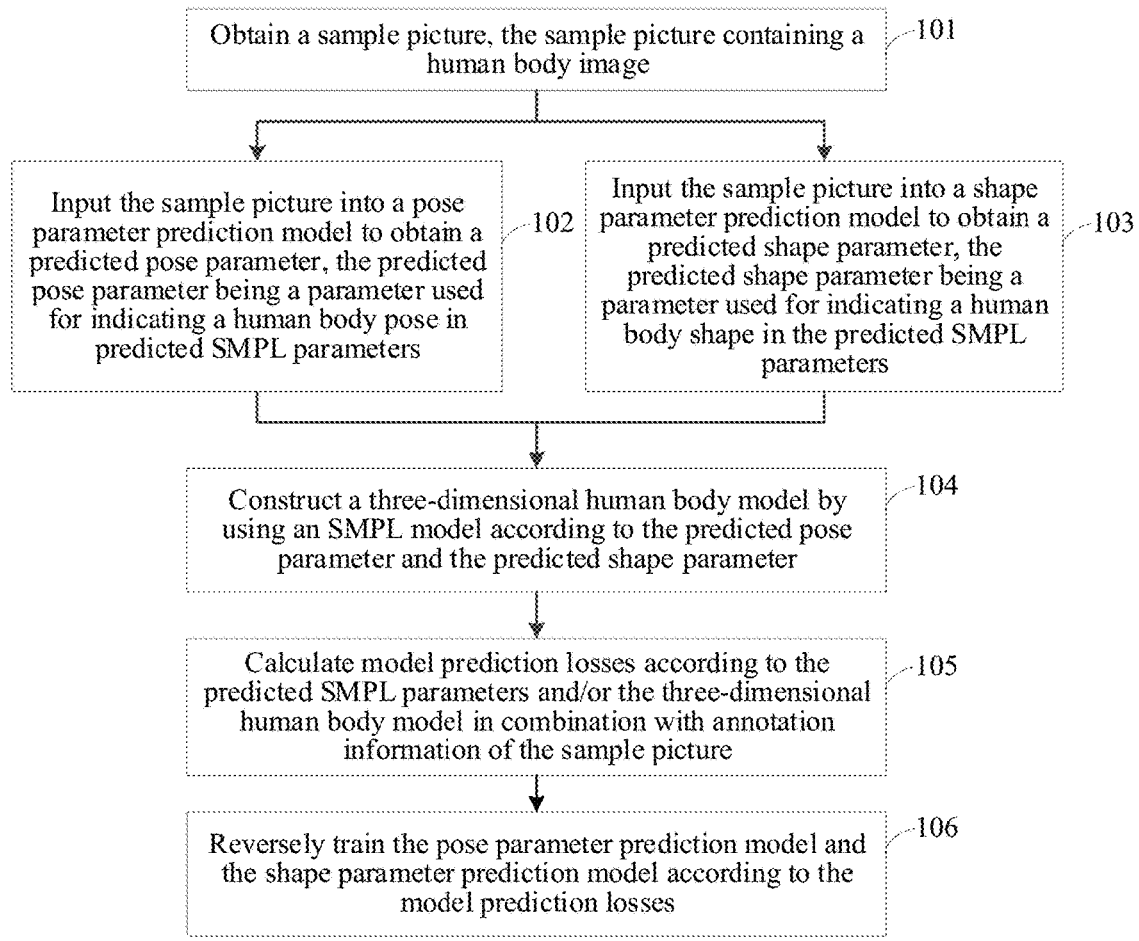
FIG. 1 is a method flowchart of a method for training an SMPL parameter prediction model according to an embodiment of this application.

To make objectives, technical solutions, and advantages of this application clearer, the following further describes implementations of this application in detail with reference to the accompanying drawings.

To facilitate understanding, the following explains terms involved in the embodiments of this application.

SMPL model: It is a parametric human body model, driven by SMPL parameters. The SMPL parameters include shape parameters $\beta$ and pose parameters $\theta$. The shape parameters $\beta \in \mathbb{R}^{10}$ include 10 parameters such as a height, size, and head-to-body ratio that characterize a human body; the pose parameters $\theta \in \mathbb{R}^{72}$ include 72 parameters corresponding to 24 joints (where parameters corresponding to each joint are represented by a three-dimensional rotation vector, and therefore there are a total of 24×3 parameters).

Based on the SMPL model, a three-dimensional human body model can be defined as:

$$M(\beta,\theta;\phi)=W(T+Bs(\beta)+Bp(\theta),T(\beta),\theta)$$

M is a three-dimensional human body model of any human body, and a surface of the three-dimensional human body model contains n=6890 model vertices; $\beta$ represents shape parameters; $\theta$ represents pose parameters; $\phi$ represents fixed parameters learned from three-dimensional body scan data; $T \in \mathbb{R}^{3n}$ represents model vertex parameters of an average human body model in a mean shape and a zero pose (where each vertex is represented by three-dimensional coordinates, so there are 3n parameters); Bs represents a shape-dependent blending function for adjusting the shape of the average human body model according to the shape parameters; Bp represents a pose-dependent blending function for adjusting the pose of the average human body model according to the pose parameters; T represents a function for calculating positions of joints of the human body; and W represents a standard blend skinning function.

Projection function: It is a function for projecting coordinate points in a three-dimensional space to a two-dimensional space. The projection function in the embodiments of this application is used for projecting the model vertices of the three-dimensional human body model to a two-dimensional image space. In a possible implementation, the projection function is a weak perspective projection function, and a projection parameter $C=\{C_s, C_x, C_y\}$ correspond to the projection function, where $C_s$ is a zoom parameter, and $C_x, C_y$ are translation parameters. Correspondingly, projecting coordinate points (x, y, z) in a three-dimensional space to a two-dimensional space can be expressed as:

$$\text{proj}(x,y,z)=C_s g(x+C_x,y+C_y)$$

Pose parameter prediction model: It is a neural network model for predicting a human body pose in a picture. The model input of the model is a picture, and its model output is a 72-dimensional pose parameter. In an embodiment, the pose parameter prediction model in the embodiments of this application is also used for outputting a projection parameter according to the input picture, and correspondingly, the model output of the model has 72+3=75 dimensions.

Shape parameter prediction model: It is a neural network model for predicting a human body shape in a picture. The model input of the model is a picture, and its model output is a 10-dimensional shape parameter.

Annotation information: In the field of machine learning, information used for indicating a key parameter in a training sample is referred to as annotation information, which can be generated by manual annotation. Annotation information in the embodiments of this application is used for indicating a key parameter in a human body image, and the annotation information may include at least one of SMPL parameters, two-dimensional joint coordinates, three-dimensional joint coordinates, or a two-dimensional human body contour.

Loss function: It is a non-negative real-valued function for estimating a difference between a predicted value and a ground truth of a model. The smaller the loss function of a model, the higher the robustness of the model. The loss function in the embodiments of this application is used for estimating differences between predicted parameters outputted by the pose parameter prediction model and the shape parameter prediction model and pre-annotated information.

When the SMPL model is used for three-dimensional human body reconstruction, parameters that affect the three-dimensional human body reconstruction include shape parameters and pose parameters. Therefore, a key point of three-dimensional human body reconstruction based on a single picture is to accurately predict the shape parameters and pose parameters. In related technologies, before predicting the shape parameters and pose parameters, it is necessary to first extract human body information of a human body in a picture by using a human body information extraction model, then input a series of extracted human body information into a parameter prediction model, and finally obtain SMPL parameters outputted by the parameter prediction model.

When the foregoing method is used for three-dimensional human body reconstruction, because the accuracy of the SMPL parameters is closely related to the accuracy of the extracted human body information, it is necessary to extract multi-dimensional human body information such as two-dimensional joints, three-dimensional joints, a two-dimensional human body segmentation map, and three-dimensional voxels by using the human body information extraction model. Correspondingly, it is necessary to construct a complex human body information extraction model. In addition, because a large quantity of parameters are inputted into the parameter prediction model (that is, the amount of information in the human body information is large), the complexity in construction of the parameter prediction model is also high. Furthermore, in the process of model training, it is necessary to first train the human body information extraction model and the parameter prediction model separately, and then perform joint training on the trained models, which further increases the complexity and time consumption of model training.

To avoid the above problems, in the method for training an SMPL parameter prediction model provided in the embodiments of this application, two neural network models (using a picture as the model input) for predicting pose parameters and shape parameters are designed respectively, so as to avoid separately training the human body information extraction model for extracting human body information; in addition, a corresponding loss function is designed from the perspective of the human body shape and pose, and the two neural network models are trained based on the designed loss function and annotation information. Whereby, the prediction accuracy of the neural network models is improved, which helps improve the accuracy of a reconstructed three-dimensional human body in the aspects of the human body pose and shape. Exemplary embodiments are described below.

FIG. 1 is a method flowchart of a method for training an SMPL parameter prediction model according to an embodiment of this application. This embodiment is explained by using an example in which the training method is applied to a server. The method may include the following steps:

Step 101: Obtain a sample picture, the sample picture containing a human body image.

In a possible implementation, the server performs model training based on several sample picture sets. Therefore, during the training process, the server obtains a sample picture from a sample picture set, the sample picture set containing several pre-annotated sample pictures.

In an embodiment, each sample picture corresponds to at least one type of annotation information, and types of annotation information corresponding to sample pictures in different sample picture sets are different.

For example, annotation information of sample pictures in a sample picture set A includes two-dimensional joint coordinates and a two-dimensional human body contour; annotation information of sample pictures in a sample picture set B includes two-dimensional joint coordinates and three-dimensional joint coordinates; annotation information of sample pictures in a sample picture set C includes two-dimensional joint coordinates and SMPL parameters.

Because different information in a picture needs to be used in the prediction of a pose parameter and a shape parameter, the server, after obtaining a sample picture, inputs the sample picture into a pose parameter prediction model and a shape parameter prediction model respectively.

In an embodiment, before inputting the sample picture into the pose/shape parameter prediction model, the server needs to preprocess the sample picture so that the sample picture to be inputted into the pose/shape parameter prediction model meets a model input requirement. Preprocessing methods include cropping and size scaling. For example, the size of the sample picture after preprocessing is 224×224.

Step 102: Input the sample picture into a pose parameter prediction model to obtain a predicted pose parameter, the predicted pose parameter being a parameter used for indicating a human body pose in predicted SMPL parameters corresponding to the SMPL parameter prediction model.

In an embodiment, the predicted pose parameter outputted by the pose parameter prediction model is a 72-dimensional parameter, which is used for indicating rotation vectors of 24 joints of a human body.

In a possible implementation, a backbone network structure of the pose parameter prediction model is a residual neural network (ResNet), for example, ResNet50. The specific structure of the pose parameter prediction model is not limited in the embodiments of this application. Schematically, parameter settings of each network layer in the pose parameter prediction model are shown in Table 1.

TABLE 1

| Network layer | Output size | Network layer parameters |
|---|---|---|
| Convolutional layer 1 (conv1) | 112 × 112 | 64 * 7 × 7 convolution kernels, stride = 2 |
| Max pooling layer (maxpooling) | 56 × 56 | 3 × 3 convolution kernels, stride = 2 |
| Convolutional layer 2 (conv2) | 56 × 56 | {64 * 1 × 1 convolution kernels, 64 * 3 × 3 convolution kernels, 256 * 1 × 1 convolution kernels} × 3 layers |
| Convolutional layer 3 (conv3) | 28 × 28 | {128 * 1 × 1 convolution kernels, 128 * 3 × 3 convolution kernels, 512 * 1 × 1 convolution kernels} × 4 layers |
| Convolutional layer 4 (conv4) | 14 × 14 | {256 * 1 × 1 convolution kernels, 256 * 3 × 3 convolution kernels, 2048 * 1 × 1 convolution kernels} × 6 layers |
| Convolutional layer 5 (conv5) | 7 × 7 | {512 * 1 × 1 convolution kernels, 512 * 3 × 3 convolution kernels, 2048 * 1 × 1 convolution kernels} × 3 layers |
| Fully connected layer (fc) | 1 × 1 | Average pooling, softmax activation function, 75 d (75-dimensional vector) |

Step 103: Input the sample picture into a shape parameter prediction model to obtain a predicted shape parameter, the predicted shape parameter being a parameter used for indicating a human body shape in the predicted SMPL parameters corresponding to the SMPL parameter prediction model.

In an embodiment, the predicted shape parameter outputted by the shape parameter prediction model is a 10-dimensional parameter, which is used for indicating 10 parameters such as a height, size, and head-to-body ratio of a human body.

In a possible implementation, the shape parameter prediction model is constructed based on a simplified visual geometry group (VGG) network. The specific structure of the shape parameter prediction model is not limited in the embodiments of this application. Schematically, parameter settings of each network layer in the shape parameter prediction model are shown in Table 2.

TABLE 2

| Network layer | Output size | Network layer parameters |
|---|---|---|
| Convolutional layer 1 (conv1) | 112 × 112 | 32 * 3 × 3 convolution kernels, stride = 2 |
| Convolutional layer 2 (conv2) | 56 × 56 | 64 * 3 × 3 convolution kernels, stride = 2 |
| Convolutional layer 3 (conv3) | 28 × 28 | 128 * 3 × 3 convolution kernels, stride = 2 |
| Convolutional layer 4 (conv4) | 14 × 14 | 256 * 3 × 3 convolution kernels, stride = 2 |
| Convolutional layer 5 (conv5) | 7 × 7 | 236 * 3 × 3 convolution kernels, stride = 2 |
| Fully connected layer 1 (fc1) | 1 × 1 | 512 |
| Fully connected layer 2 (fc2) | 1 × 1 | 1024 |
| Fully connected layer 3-output (fc3-output) | 1 × 1 | 10 |

Step 104: Construct a three-dimensional human body model according to the predicted pose parameter and the predicted shape parameter.

Further, the server substitutes the predicted pose parameter and the predicted shape parameter into the SMPL model to construct a three-dimensional human body model, so as to subsequently evaluate the parameter prediction performance of the three-dimensional human body model. The three-dimensional human body model contains vertex coordinates of 6,890 model vertices.

Step 105: Calculate the model prediction losses according to the predicted SMPL parameters corresponding to the SMPL parameter prediction model and/or the three-dimensional human body model in combination with annotation information of the sample picture.

To measure the difference between a prediction result and a ground truth, in a possible implementation, the server calculates the model prediction loss by using a pre-built loss function according to the prediction result and the annotation information of the sample picture. In an embodiment, the loss function includes at least one sub-loss function, and different sub-loss functions are used for calculating the model prediction loss according to different types of annotation information.

In an embodiment, because sample pictures in different sample picture sets contain different annotation information, the server determines, according to annotation information of a sample picture, to use a corresponding sub-loss function to calculate the model prediction loss.

In an embodiment, the server calculates the model prediction loss according to the annotation information and predicted SMPL parameters, and/or the server calculates the model prediction loss according to the annotation information and the three-dimensional human body model.

Step 106: Reversely train or update the pose parameter prediction model and the shape parameter prediction model according to the model prediction losses.

In a possible implementation, according to the calculated model prediction losses, the server reversely trains the pose parameter prediction model and the shape parameter prediction model (i.e., optimizes parameters in the models) by using a gradient descent algorithm, and stops reverse training when the gradient is less than a threshold. The specific method for reversely training the model is not limited in the embodiments of this application.

In an embodiment, the model training process is performed using a learning rate of 1e-4 and a batch size of 96.

In summary, in this embodiment of this application, a sample picture containing a human body image is inputted into a pose parameter prediction model and a shape parameter prediction model respectively to obtain a predicted pose parameter and a predicted shape parameter in the predicted SMPL parameters; a three-dimensional human body model is constructed based on the predicted pose parameter and the predicted shape parameter; a model prediction loss is calculated based on annotation information of the sample picture and at least one of the predicted SMPL parameters or the three-dimensional human body model; and the pose parameter prediction model and the shape parameter prediction model are reversely trained according to the model prediction loss. When this method provided in the embodiments of this application is used to train a model, a sample picture is directly used as a model input for model training, and there is no need to separately train a model for extracting human body information in a picture, thereby reducing the complexity of model training and improving the efficiency of model training. In addition, the calculation of the model prediction loss according to annotation information, predicted parameters, and a three-dimensional human body model constructed based on the predicted parameters helps improve the training quality of the model, thereby improving the accuracy of predicted parameters.

In a possible implementation, the loss function predefined by the server includes four sub-loss functions: a SMPL parameter loss function, a joint position loss function, a human body contour loss function, and a regular loss function. The SMPL parameter loss function is used for measuring differences between the predicted pose parameter and predicted shape parameter and annotated SMPL parameters; the joint position loss function is used for measuring a difference between a predicted joint position and an annotated joint position; and the human body contour loss function is used for measuring a difference between a human body contour of a reconstructed three-dimensional human body model and a human body contour in a sample picture.

Figure 2:
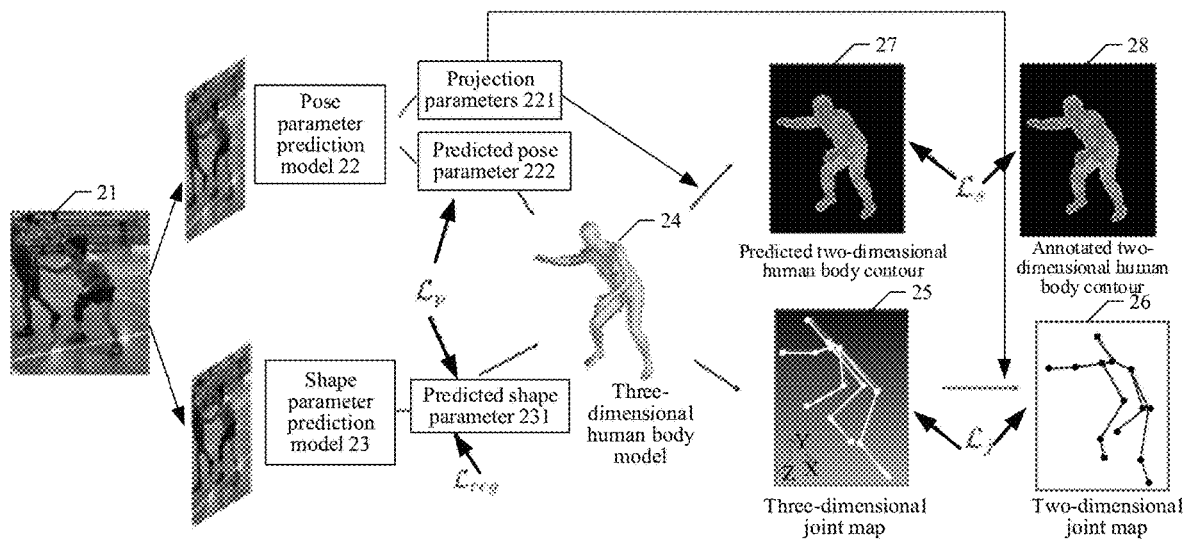
FIG. 2 is a schematic diagram illustrating the principle of a method for training an SMPL parameter prediction model according to an embodiment of this application.

Correspondingly, a process of the server training the model is shown in FIG. 2. After inputting a sample picture 21 into a pose parameter prediction model 22, the server obtains a projection parameter 221 and a predicted pose parameter 222 outputted by the pose parameter prediction model 22. After inputting the sample picture 21 into a shape parameter prediction model 23, the server obtains a predicted shape parameter 231 outputted by the shape parameter prediction model 23. Further, based on the predicted pose parameter 222 and the predicted shape parameter 231 obtained by prediction, the server constructs a three-dimensional human body model 24 by using the SMPL model. The process of calculating the model prediction loss according to the predicted parameters, the three-dimensional human body model, and the annotation information is described below with reference to exemplary embodiments.

Figure 3:
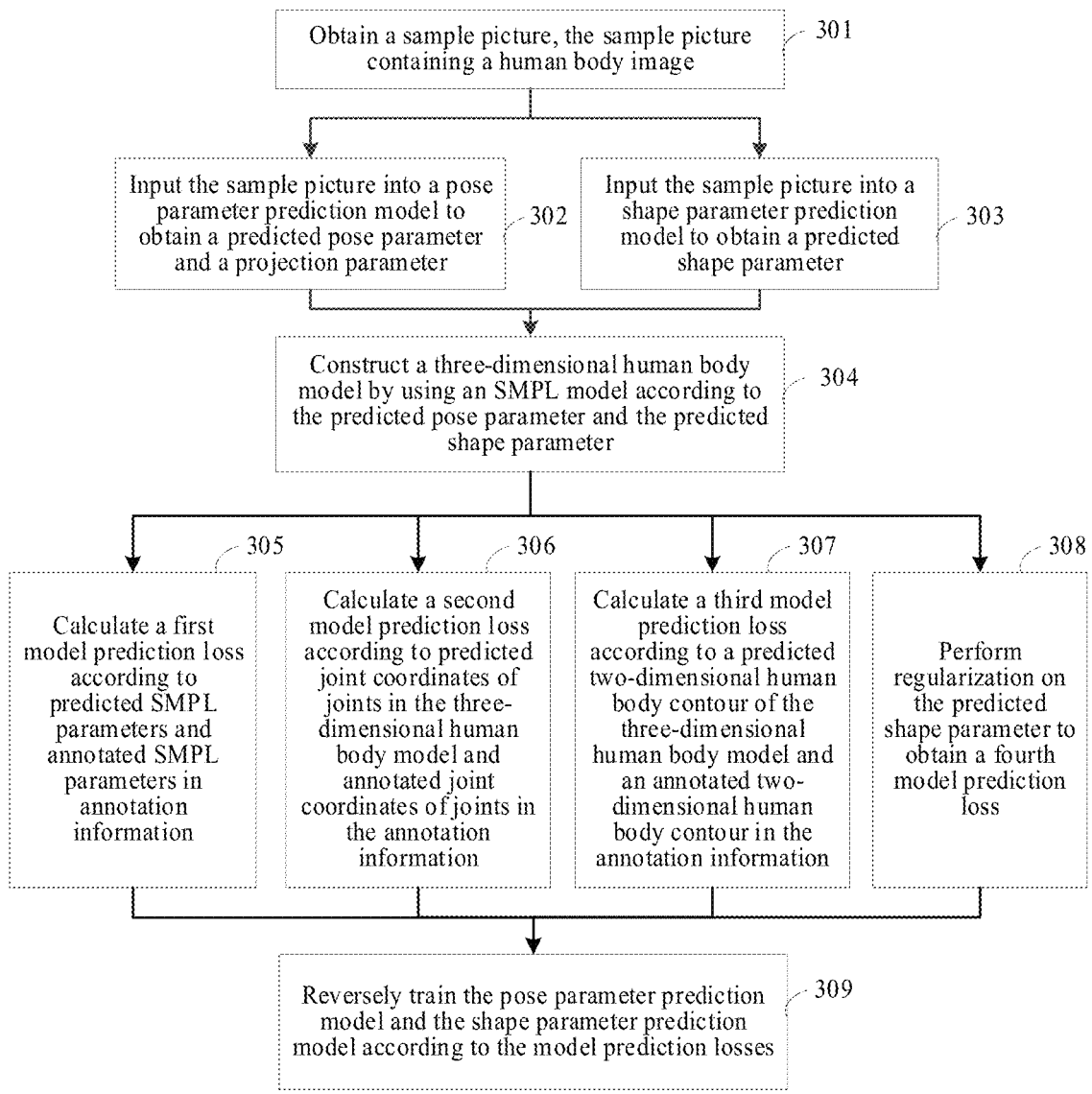
FIG. 3 is a method flowchart of a method for training an SMPL parameter prediction model according to another embodiment of this application.

FIG. 3 is a method flowchart of a method for training an SMPL parameter prediction model according to another embodiment of this application. This embodiment is explained by using an example in which the training method is applied to a server. The method may include the following steps:

Step 301: Obtain a sample picture, the sample picture containing a human body image.

For the implementation of this step, reference may be made to step 101, and the details will not be described again in this embodiment.

Step 302: Input the sample picture into a pose parameter prediction model to obtain a predicted pose parameter and a projection parameter.

Because subsequent calculation of the model prediction loss needs to use two-dimensional coordinates (for example, two-dimensional coordinates of joints and two-dimensional coordinates of a human body contour) but the three-dimensional human body model constructed based on the predicted pose parameter and the predicted shape parameter only contains three-dimensional coordinates of the model vertices, a projection parameter of the sample picture also needs to be predicted while predicting the pose parameter and the shape parameter by using the model, so that points on the three-dimensional human body model can subsequently be projected into a two-dimensional image space by using the projection parameter. The projection parameter is related to a photographing angle of the sample picture.

In the implementation process, it is found that changing the zoom parameter $C_s$ in the projection parameter or changing the shape parameter $\beta$ affects the human body shape, resulting in ambiguity in the prediction of the projection parameter and the shape parameter. To avoid the ambiguity in the prediction of the projection parameter and the shape parameter, in a possible implementation, the server predicts the pose parameter and the projection parameter by using the pose parameter prediction model. In this case, parameters outputted by the predicted pose parameter model have a total of 75 dimensions, including a 72-dimensional predicted pose parameter $\theta$ and a 3-dimensional projection parameter C.

Step 303: Input the sample picture into a shape parameter prediction model to obtain a predicted shape parameter.

Step 304: Construct a three-dimensional human body model by using an SMPL model according to the predicted pose parameter and the predicted shape parameter.

For the implementation of steps 303 and 304, reference may be made to steps 103 and 104, and the details will not be described again in this embodiment.

Step 305: Calculate a first model prediction loss according to predicted SMPL parameters and annotated SMPL parameters in annotation information.

Figure 4:
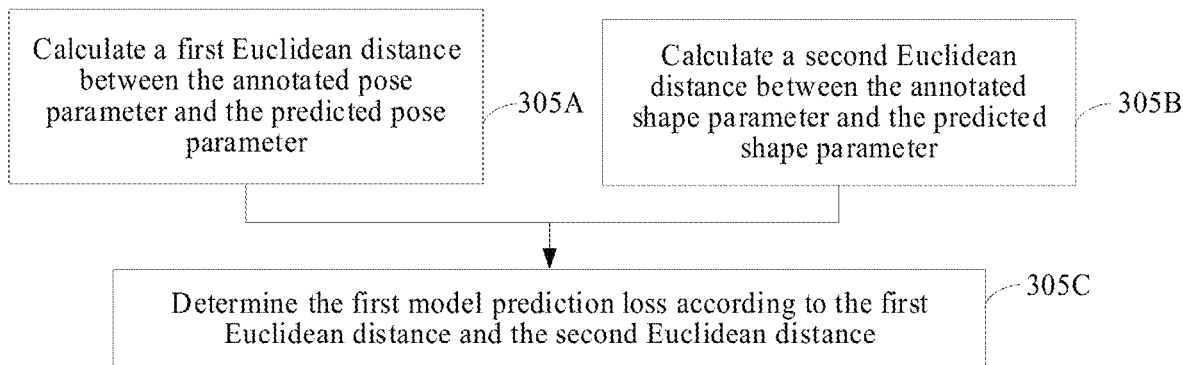
FIG. 4 is a method flowchart of a process of calculating a first model prediction loss according to an embodiment.

In an embodiment, when the annotation information of the sample picture includes annotated SMPL parameters (including an annotated pose parameter and an annotated shape parameter), the server calculates the first model prediction loss by using an SMPL parameter loss function according to the predicted SMPL parameters (including a predicted pose parameter and a predicted shape parameter) and the annotated SMPL parameters. In a possible implementation, as shown in FIG. 4, this step includes the following steps.

Step 305A: Calculate a first Euclidean distance between the annotated pose parameter and the predicted pose parameter.

In this embodiment, the server calculates the first Euclidean distance between the annotated pose parameter and the predicted pose parameter (a Euclidean distance between 72-dimensional vectors), and then evaluates the accuracy of prediction of the pose parameter according to the first Euclidean distance. The smaller the first Euclidean distance, the higher the accuracy of prediction of the pose parameter.

Schematically, the first Euclidean distance=$\|\theta - \hat{\theta}\|_2$, where $\theta$ is the predicted pose parameter, and $\hat{\theta}$ is the annotated pose parameter.

Step 305B: Calculate a second Euclidean distance between the annotated shape parameter and the predicted shape parameter.

Similar to the calculation of the first Euclidean distance, in this embodiment, the server calculates the second Euclidean distance between the annotated shape parameter and the predicted shape parameter (a Euclidean distance between 10-dimensional vectors), and then evaluates the accuracy of prediction of the shape parameter according to the second Euclidean distance. The smaller the second Euclidean distance, the higher the accuracy of prediction of the shape parameter.

Schematically, the second Euclidean distance=$\|\beta - \hat{\beta}\|_2$, where $\beta$ is the predicted shape parameter, and $\hat{\beta}$ is the annotated shape parameter.

Step 305C: Determine the first model prediction loss according to the first Euclidean distance and the second Euclidean distance.

Further, according to the calculated first Euclidean distance and second Euclidean distance, the server calculates the first model prediction loss (that is, an SMPL parameter prediction loss). In an embodiment, the first model prediction loss $L_p$ is expressed as:

$$L_p = \lambda_p(\|\beta - \hat{\beta}\|_2 + \|\theta - \hat{\theta}\|_2)$$

where $\lambda_p$ is a parameter loss weight. For example, $\lambda_p$ is 60.

Schematically, as shown in FIG. 2, the server calculates the first model prediction loss $L_p$ according to the predicted pose parameter 222 and the predicted shape parameter 231.

Step 306: Calculate a second model prediction loss according to predicted joint coordinates of joints in the three-dimensional human body model and annotated joint coordinates of joints in the annotation information.

In an embodiment, when the annotation information of the sample picture contains the annotated joint coordinates (including two-dimensional annotated joint coordinates and/or three-dimensional annotated joint coordinates), the server first determines the predicted joint coordinates of the joints in the three-dimensional human body model, and calculates the second model prediction loss by using the joint position loss function according to the predicted joint coordinates and the annotated joint coordinates.

Figure 5:
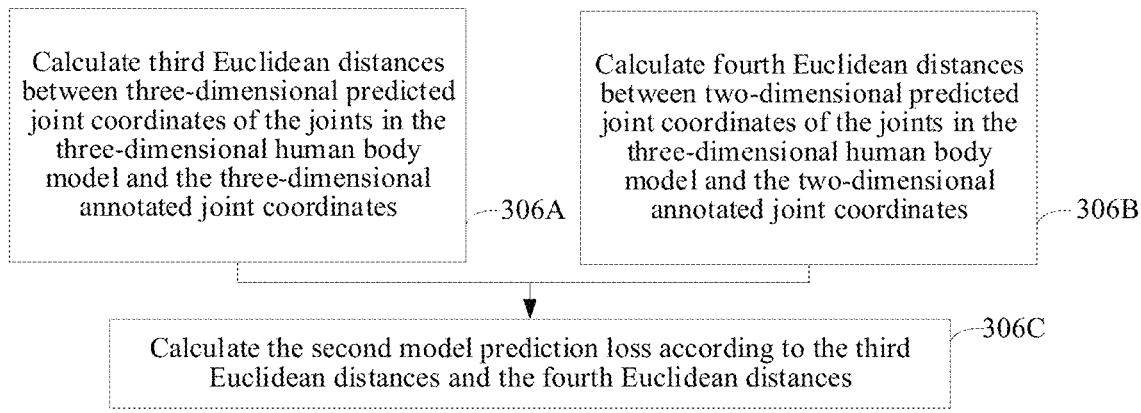
FIG. 5 is a method flowchart of a process of calculating a second model prediction loss according to an embodiment.

In a possible implementation, as shown in FIG. 5, this step includes the following steps.

Step 306A: Calculate third Euclidean distances between three-dimensional predicted joint coordinates of the joints in the three-dimensional human body model and the three-dimensional annotated joint coordinates.

In a possible implementation, the server selects 14 joints among 24 joints as target joints, and calculates the third Euclidean distances between the three-dimensional predicted joint coordinates and the three-dimensional annotated joint coordinates of the 14 target joints.

Regarding a method of calculating the three-dimensional predicted joint coordinates of the joints in the three-dimensional human body model, in an embodiment, the server determines the three-dimensional predicted joint coordinates of the joints in the three-dimensional human body model according to vertex coordinates of model vertices around the joints in the three-dimensional human body model. In a possible implementation, the three-dimensional predicted joint coordinates of a joint are an average value of vertex coordinates of model vertices around the joint.

Schematically, as shown in FIG. 2, the server generates a three-dimensional joint map 25 according to the three-dimensional human body model 24, and the three-dimensional joint map 25 contains three-dimensional predicted joint coordinates of each joint.

After the three-dimensional predicted joint coordinates of each joint are calculated, the server calculates the third Euclidean distance between the three-dimensional predicted joint coordinates and the three-dimensional annotated joint coordinates (corresponding to the same joint). Schematically $$\sum_{j \in F_M} \|M(j) - \hat{j}_{3D}\|_2.$$

where $F_M$ is a collection of joints, M (j) is three-dimensional predicted joint coordinates of the joint in the three-dimensional human body model, and $\hat{j}_{3D}$ is three-dimensional annotated joint coordinates of the joint.

Step 306B: Calculate fourth Euclidean distances between two-dimensional predicted joint coordinates of the joints in the three-dimensional human body model and the two-dimensional annotated joint coordinates.

In addition to measuring the accuracy of the three-dimensional joint coordinates, the server can further measure the accuracy of the two-dimensional joint coordinates. In a possible implementation, this step includes the following steps:

First: Determine the three-dimensional predicted joint coordinates of the joints in the three-dimensional human body model according to vertex coordinates of model vertices around the joints in the three-dimensional human body model.

Because the two-dimensional joints can be obtained by projection transformation of the three-dimensional joints, the server first determines the three-dimensional predicted joint coordinates of the joints before calculating the two-dimensional predicted joint coordinates. For the process of determining the three-dimensional predicted joint coordinates, reference may be made to step 306A, and the details will not be described again in this step.

Second: Perform projection processing on the three-dimensional predicted joint coordinates according to the projection parameter to obtain the two-dimensional predicted joint coordinates.

Because the pose parameter prediction model also outputs the projection parameter in addition to the predicted pose parameter, the server can perform projection processing on the three-dimensional predicted joint coordinates according to the projection parameter, that is, project the three-dimensional joints into a two-dimensional image space to obtain two-dimensional predicted joint coordinates of two-dimensional joints.

For example, for three-dimensional predicted joint coordinates M (j), the two-dimensional predicted joint coordinates obtained by projection processing are proj(M(j)).

Schematically, as shown in FIG. 2, the server generates a two-dimensional joint map 26 according to the three-dimensional joint map 25 and the projection parameter 221, the two-dimensional joint map 26 containing the two-dimensional predicted joint coordinates of each joint.

Third: Calculate the fourth Euclidean distances between the two-dimensional predicted joint coordinates and the two-dimensional annotated joint coordinates.

After the two-dimensional predicted joint coordinates of each joint are calculated, the server calculates the fourth Euclidean distance between the two-dimensional predicted joint coordinates and the two-dimensional annotated joint coordinates (corresponding to the same joint). Schematically, $$\sum_{j \in F_M} \|proj(M(j)) - \hat{j}_{2D}\|_2.$$

where $F_M$ is a collection of joints, M (j) is three-dimensional predicted joint coordinates of the joint in the three-dimensional human body model, proj is projection processing, and $\hat{j}_{2D}$ is two-dimensional annotated joint coordinates of the joint.

Step 306C: Calculate the second model prediction loss according to the third Euclidean distances and the fourth Euclidean distances.

Further, according to the calculated third Euclidean distances and fourth Euclidean distances, the server calculates the second model prediction loss (that is, a joint position prediction loss). In an embodiment, the second model prediction loss $L_i$ is expressed as:

$$L_j = \lambda_{3D} \sum_{j \in F_M} \|M(j) - \hat{j}_{3D}\|_2 + \lambda_{2D} \sum_{j \in F_M} \|proj(M(j)) - \hat{j}_{2D}\|_2$$

where $\lambda_{3D}$ is a three-dimensional joint position loss weight, and $\lambda_{2D}$ is a two-dimensional joint position loss weight. For example, $\lambda_{3D}$ and $\lambda_{3D}$ are both 60.0.

Schematically, as shown in FIG. 2, the server calculates the second model prediction loss $L_j$ according to the three-dimensional joint map 25 and the two-dimensional joint map 26.

Figure 6:
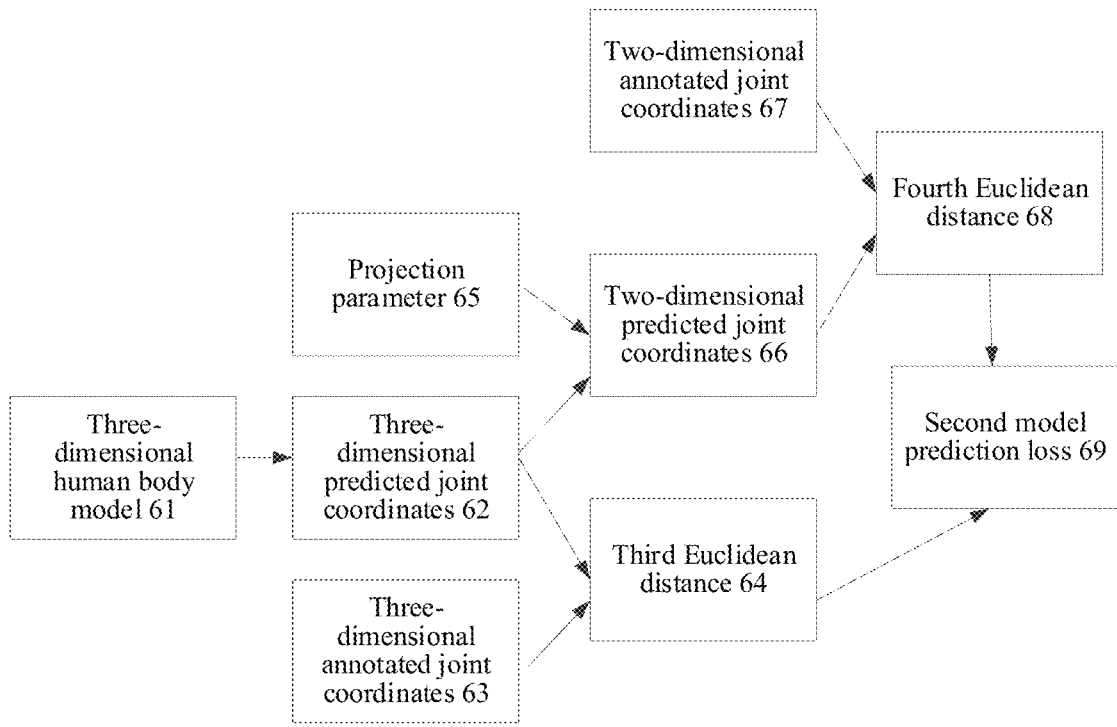
FIG. 6 is a schematic diagram illustrating the principle of a process of calculating a second model prediction loss according to an embodiment.

As shown in FIG. 6, in a complete process of calculating the second model prediction loss, the server first determines three-dimensional predicted joint coordinates 62 of a joint according to a three-dimensional human body model 61, and calculates third Euclidean distances 64 according to the three-dimensional predicted joint coordinates 62 and three-dimensional annotated joint coordinates 63 in annotation information. The server also performs projection processing on the three-dimensional predicted joint coordinates 62 according to a projection parameter 65 to obtain two-dimensional predicted joint coordinates 66 corresponding to the joint, and calculates fourth Euclidean distances 68 according to the two-dimensional predicted joint coordinates 66 and two-dimensional annotated joint coordinates 67 in the annotation information. Finally, the server determines a second model prediction loss 69 according to the third Euclidean distances 64 and the fourth Euclidean distances 68.

When the annotation information corresponding to the sample picture only contains one of the three-dimensional annotated joint coordinates or the two-dimensional annotated joint coordinates, the server may determine the second model prediction loss based on only the third Euclidean distances or the fourth Euclidean distances, which is not limited in this embodiment.

Step 307: Calculate a third model prediction loss according to a predicted two-dimensional human body contour of the three-dimensional human body model and an annotated two-dimensional human body contour in the annotation information.

When the annotation information includes an annotated two-dimensional human body contour, to improve the accuracy of prediction of the human body shape, the server can further generate a predicted two-dimensional human body contour according to the constructed three-dimensional human body model, so as to determine the accuracy of the prediction of the human body shape by calculating a loss between the human body contours.

In an embodiment, the human body contour is used for indicating a human body region in the picture, and can be represented by a black-and-white image, where a white region in the black-and-white image is the human body region.

Schematically, as shown in FIG. 2, the server generates a predicted two-dimensional human body contour 27 according to the three-dimensional human body model 24, and calculates the third model prediction loss $L_s$ according to the annotated two-dimensional human body contour 28.

Figure 7:
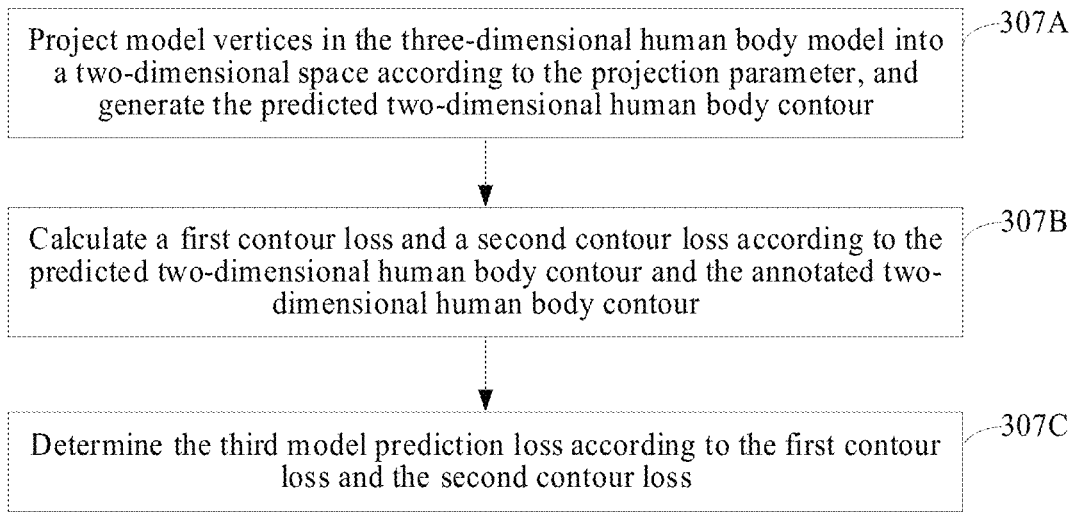
FIG. 7 is a method flowchart of a process of calculating a third model prediction loss according to an embodiment.

In a possible implementation, as shown in FIG. 7, this step may include the following steps:

Step 307A: Project model vertices in the three-dimensional human body model into a two-dimensional space according to the projection parameter, and generate the predicted two-dimensional human body contour.

If the prediction of the human body pose and shape is accurate, a two-dimensional human contour obtained after the three-dimensional human body model is projected into a two-dimensional image space is expected to coincide with a two-dimensional human contour in the sample picture. Therefore, the server can measure the accuracy of the prediction of the human body pose and shape based on the difference between the two-dimensional human body contours.

In an embodiment, the server projects each model vertex in the three-dimensional human body model into a two-dimensional space by using a projection function according to the projection parameter, so as to generate a two-dimensional image containing a predicted two-dimensional human body contour.

Step 307B: Calculate a first contour loss and a second contour loss according to the predicted two-dimensional human body contour and the annotated two-dimensional human body contour.

The first contour loss is also referred to as a forward contour loss, which is used for indicating a loss from a predicted two-dimensional human body contour to an annotated two-dimensional human body contour. The second contour loss is also referred to as a backward contour loss, which is used for indicating a loss from an annotated two-dimensional human body contour to a predicted two-dimensional human body contour.

In a possible implementation, the server may calculate the contour loss by performing the following steps.

First: Calculate a first shortest distance from each contour point in the predicted two-dimensional human body contour to the annotated two-dimensional human body contour; and calculate the first contour loss according to the first shortest distance corresponding to each contour point in the predicted two-dimensional human body contour.

In a possible implementation, the server calculates the first shortest distance from each contour point in the predicted two-dimensional human body contour to the annotated two-dimensional human body contour, and adds up the first shortest distance corresponding to each contour point to obtain the first contour loss.

However, during the implementation process, it is found that for a blocked region (blocked by other objects) of the three-dimensional human body model, because the blocked region is not visible, calculating the first contour loss directly based on the first shortest distance without considering visibility leads to a too large first contour loss. Therefore, to improve the accuracy of the first contour loss, in a possible implementation, the calculating the first contour loss according to the first shortest distance corresponding to each contour point in the predicted two-dimensional human body contour includes the following steps:

1. Determine a first weight of the contour point corresponding to each model vertex according to visibility of the joint to which the each model vertex in the three-dimensional human body model belongs.

In an embodiment, for each model vertex v in the three-dimensional human body model, the server automatically allocates the each model vertex v to a closest joint J(v). The server allocates the model vertices to 14 joints J(v).

After calculating the first shortest distance corresponding to each contour point in the predicted two-dimensional human body contour, the server detects the visibility of the joint to which the model vertex corresponding to the each contour point belongs. If the joint to which a model vertex belongs is visible, the server determines that the first weight of the contour point is 1; if the joint to which a model vertex belongs is invisible, the server determines that the first weight of the contour point is 0. The following formula can be used to determine the first weight of the contour point corresponding to the model vertex:

$$\omega_v = \begin{cases} 1, & \text{if } J(v) \text{ is visible} \\ 0, & \text{otherwise} \end{cases}$$

where $\omega_v$ is the first weight of the contour point corresponding to the model vertex v, and J(v) is the joint to which the model vertex v belongs.

Certainly, the server may also first detect the visibility of the joint to which the model vertex corresponding to the contour point belongs, and when the joint is not visible, stop calculating the shortest distance from the contour point corresponding to the model vertex to the annotated two-dimensional human body contour, thereby reducing the amount of calculation.

2. Calculate the first contour loss according to the first weight and the first shortest distance corresponding to each contour point in the predicted two-dimensional human body contour.

Correspondingly, the server corrects the first shortest distance corresponding to each contour point according to the first weight, and adds up the corrected first shortest distances to obtain the first contour loss.

In addition, it is also found during the implementation that the inaccurate prediction of joints also affects the predicted two-dimensional human body contour generated by projection. Therefore, to reduce the impact of inaccurate prediction of joints on the first contour loss, in a possible implementation, the calculating the first contour loss according to the first shortest distance corresponding to each contour point in the predicted two-dimensional human body contour may further include the following steps:

1. Determine the predicted joint coordinates of the joint to which each model vertex in the three-dimensional human body model belongs.

In a possible implementation, for each model vertex v in the three-dimensional human body model, the server automatically allocates the model vertex v to a closest joint J(v), and projects the joint J(v) into a two-dimensional space by using the projection parameter, to obtain (two-dimensional) predicted joint coordinates of the joint J(v). The predicted joint coordinates of the joint J(v) to which each model vertex v belongs=proj(M (J (v))).

2. Determine a second weight of the contour point corresponding to each model vertex according to a fifth Euclidean distance between the predicted joint coordinates and the annotated joint coordinates, the second weight and the fifth Euclidean distance having a negative correlation.

After the predicted joint coordinates of the joint are determined, the server determines the accuracy of the prediction of the joint by calculating the fifth Euclidean distance between the predicted joint coordinates and the annotated joint coordinates (of the same joint). The fifth Euclidean distance=$\|\text{proj}(M(J(v)))-\hat{J}(v)_{2D}\|_2$, where $\hat{J}(v)_{2D}$ is (two-dimensional) annotated joint coordinates of the joint J(v).

Further, the server determines the second weight of the contour point corresponding to the model vertex to which the joint belongs according to the fifth Euclidean distance, the second weight being a positive value, and the second weight and the fifth Euclidean distance having a negative correlation.

In a possible implementation, the following formula can be used to determine the second weight of the contour point corresponding to the model vertex:

$$\omega_p = \exp(-\|\text{proj}(M(J(v)))-\hat{J}(v)_{2D}\|_2)$$

The more accurate the prediction of the joint coordinates, the closer $\|\text{proj}(M(J(v)))-\hat{J}(v)_{2D}\|_2$ is to 0, and correspondingly, the closer the second weight $\omega_p$ is to 1. The more inaccurate the prediction of the joint coordinates, the closer $\|\text{proj}(M(J(v)))-\hat{J}(v)_{2D}\|_2$ is to $-\infty$, and correspondingly, the closer the second weight $\omega_p$ is to 0.

3. Calculate the first contour loss according to the second weight and the first shortest distance corresponding to each contour point in the predicted two-dimensional human body contour.

Correspondingly, the server corrects the first shortest distance corresponding to each contour point according to the second weight, and adds up the corrected first shortest distances to obtain the first contour loss.

In a possible implementation, the server calculates the first weight and the second weight at the same time, and calculates the first contour loss according to the first shortest distance, the first weight, and the second weight corresponding to each contour point in the predicted two-dimensional human body contour. Correspondingly, the first contour loss can be expressed as:

$$L_{M2S} = \sum_{p \in M} \omega_v \omega_p \|p - Sp\|_2^2$$

where M is the predicted two-dimensional human body contour, and $S_p$ is a point in the annotated two-dimensional human body contour closest to the contour point p in the predicted two-dimensional human body contour.

Second: Calculate a second shortest distance from each contour point in the annotated two-dimensional human body contour to the predicted two-dimensional human body contour; and calculate the second contour loss according to the second shortest distance corresponding to each contour point in the annotated two-dimensional human body contour.

In a possible implementation, the server calculates the second shortest distance from each contour point in the annotated two-dimensional human body contour to the predicted two-dimensional human body contour, and adds up the second shortest distance corresponding to each contour point to obtain the second contour loss. Correspondingly, the second contour loss can be expressed as:

$$L_{S2M} = \sum_{q \in S_b} \|q - M_q\|_2^2$$

where $S_b$ is the annotated two-dimensional human body contour, and $M_q$ is a point in the predicted two-dimensional human body contour closest to the contour point q in the annotated two-dimensional human body contour.

Step 307C: Determine the third model prediction loss according to the first contour loss and the second contour loss.

In a possible implementation, the server calculates the third model prediction loss according to the first contour loss, a weight corresponding to the first contour loss, the second contour loss, and a weight corresponding to the second contour loss. The third model prediction loss can be expressed as:

$$L_s = \lambda_{M2S} L_{M2S} + \lambda_{S2M} L_{S2M}$$

where $\lambda_{M2S}$ is the weight corresponding to the first contour loss, and $\lambda_{S2M}$ is the weight corresponding to the second contour loss. For example, $\lambda_{M2S}$ and $\lambda_{S2M}$ are both 3.0.

Figure 8:
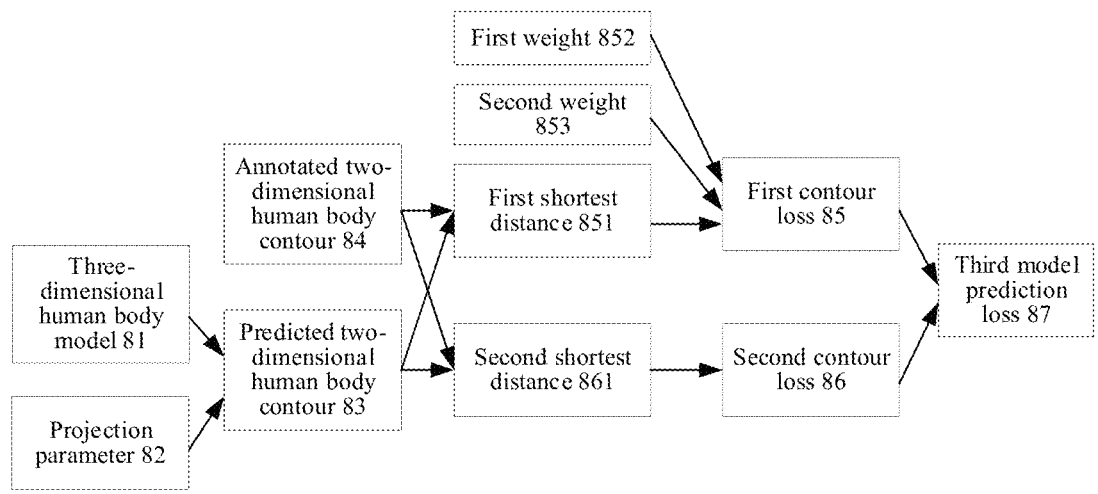
FIG. 8 is a schematic diagram illustrating the principle of a process of calculating a third model prediction loss according to an embodiment.

As shown in FIG. 8, in a complete process of calculating the third model prediction loss, the server first generates a predicted two-dimensional human body contour 83 according to a three-dimensional human body model 81 and a projection parameter 82, then calculates a first contour loss 85 and a second contour loss 86 according to the predicted two-dimensional human body contour 83 and an annotated two-dimensional human body contour 84, and finally determines a third model prediction loss 87 according to the first contour loss 85 and the second contour loss 86. In the process of calculating the first contour loss 85, when the server calculates a first shortest distance 851 from each contour point on the predicted two-dimensional human body contour 83 to the annotated two-dimensional human body contour 84, the server also determines a first weight 852 according to the visibility of the joint to which each contour point belongs, and determines a second weight 853 according to the accuracy of the prediction of the joint to which each contour point belongs, so as to calculate the first contour loss 85 according to the first shortest distance 851, the first weight 852, and the second weight 853. In the process of calculating the second contour loss 86, the server calculates a second shortest distance 861 from each contour point on the annotated two-dimensional human body contour 84 to the predicted two-dimensional human body contour 83, so as to determine the second contour loss 86 according to the second shortest distance 861.

Step 308: Perform regularization on the predicted shape parameter to obtain a fourth model prediction loss.

To avoid excessive deformation of the human body shape, in a possible implementation, the server performs L2 regularization on the predicted shape parameter to obtain the fourth model prediction loss $L_{reg}=\lambda_{reg}\|\beta\|_2$, where $\lambda_{reg}$ is a regular loss weight. For example, $\lambda_{reg}$ is 1.0.

Schematically, as shown in FIG. 2, the server obtains the fourth model prediction loss $L_{reg}$ according to the predicted shape parameter 231.

Step 309: Reversely train the pose parameter prediction model and the shape parameter prediction model according to the model prediction losses.

In a possible implementation, the server reversely trains the pose parameter prediction model and the shape parameter prediction model based on the first, second, third, and fourth model prediction losses calculated in the foregoing steps. For the process of reverse training, reference may be made to step 106, and the details will not be described again in this embodiment.

Because types of annotation information contained in different sample picture sets are different, the server may perform reverse training according to a part of the foregoing model prediction losses, which is not limited in this embodiment.

In this embodiment, by introducing the human body contour item as a constraint, the server projects the model vertices of the reconstructed three-dimensional human body model to the two-dimensional space according to the projection parameter to obtain the predicted two-dimensional human body contour, and reversely trains the models by using the contour loss between the predicted two-dimensional human body contour and the annotated two-dimensional human body contour, which helps improve the accuracy of the prediction of the predicted shape parameter, thereby improving the accuracy of the reconstructed three-dimensional human body model in the human body shape.

In addition, the calculation of the contour loss between the predicted two-dimensional human body contour and the annotated two-dimensional human body contour fully considers the visibility of the joints and the influence of the accuracy of the prediction of joint coordinates on the contour loss, thereby further improving the accuracy of the calculated contour loss.

Figure 9:
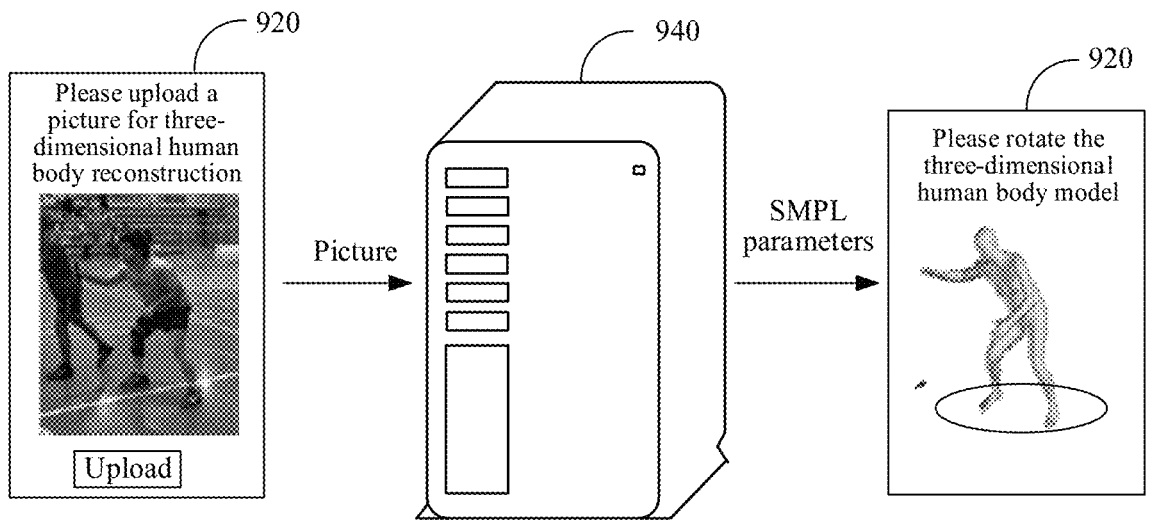
FIG. 9 is a schematic scenario diagram of an application scenario according to an embodiment of this application.

After the model training is completed by using the training method provided in the foregoing embodiment, the trained models can be used to perform three-dimensional reconstruction on a human body in a single image. In a possible application scenario, as shown in FIG. 9, a terminal 920 uploads a picture containing a human body image to a server 940. After receiving the picture, the server 940 predicts a pose parameter of the human body in the picture by using a pose parameter prediction model, predicts a shape parameter of the human body in the picture by using a shape parameter prediction model, and sends SMPL parameters including the pose parameter and the shape parameter to the terminal 920. After receiving the SMPL parameters, the terminal 920 reconstructs a three-dimensional human body model by using an SMPL model and displays the reconstructed three-dimensional human body model. Certainly, if the pose parameter prediction model and the shape parameter prediction model are stored in the terminal 920, the terminal 920 may also perform SMPL parameter prediction locally without the participation of the server 940.

In other possible application scenarios, after acquiring an image containing a human body of a player by using a camera, a VR device predicts a pose parameter of the player by using a built-in pose parameter prediction model and predicts a shape parameter of the player by using a built-in shape parameter prediction model; reconstructs a three-dimensional human body model of the player according to the pose parameter and the shape parameter; and displays the three-dimensional human body model of the player on the VR screen in real time, thereby increasing the sense of immersion experienced by the player when using the VR device.

Certainly, the above models obtained through training may also be applicable to other scenarios of reconstructing a three-dimensional human body model based on a single picture (including a human body) or a video (with video frames containing a continuous human body), which is not limited in the embodiments of this application.

Figure 10:
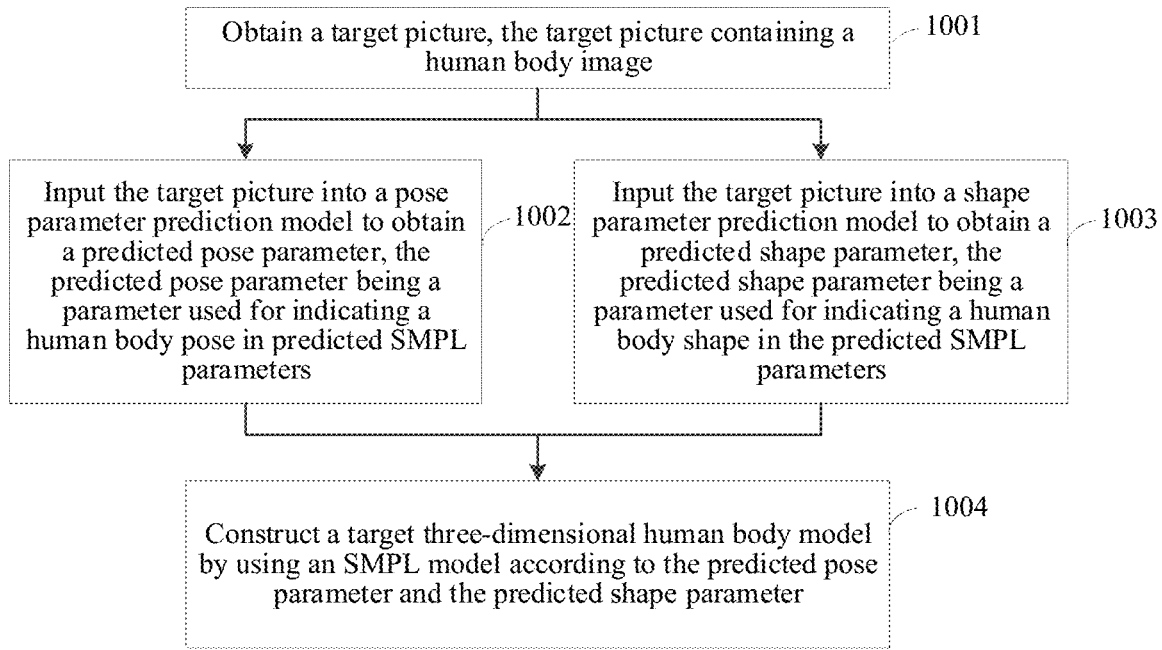
FIG. 10 is a method flowchart of a three-dimensional human body reconstruction method according to an embodiment of this application.

FIG. 10 is a method flowchart of a three-dimensional human body reconstruction method according to an embodiment of this application. This embodiment is described by using an example in which the method is applied to a server. The method may include the following steps:

Step 1001: Obtain a target picture, the target picture containing a human body image.

In an embodiment, the target picture is a single picture uploaded by a terminal, or the target picture is a video frame captured from a video uploaded by a terminal.

In an embodiment, before inputting the target picture into a pose/shape parameter prediction model, the server needs to preprocess the target picture so that the target picture to be inputted into the pose/shape parameter prediction model meets a model input requirement. Preprocessing methods include cropping and size scaling. For example, the size of the target picture after preprocessing is 224×224.

Step 1002: Input the target picture into a pose parameter prediction model to obtain a predicted pose parameter, the predicted pose parameter being a parameter used for indicating a human body pose in the predicted SMPL parameters corresponding to the SMPL parameter prediction model.

In an embodiment, after the server inputs the target picture into the pose parameter prediction model, the pose parameter prediction model outputs a 72-dimensional predicted pose parameter. When the pose parameter prediction model outputs a 75-dimensional parameter, the server determines a parameter with 72 dimensions as predicted pose parameter, and determines a parameter with the remaining 3 dimensions as the projection parameter.

Step 1003: Input the target picture into a shape parameter prediction model to obtain a predicted shape parameter, the predicted shape parameter being a parameter used for indicating a human body shape in the predicted SMPL parameters corresponding to the SMPL parameter prediction model.

In an embodiment, after the server inputs the target picture into the shape parameter prediction model, the shape parameter prediction model outputs a 10-dimensional predicted shape parameter.

Step 1004: Construct a target three-dimensional human body model according to the predicted pose parameter and the predicted shape parameter.

The server inputs the predicted shape parameter and the predicted pose parameter outputted by the models into the SMPL model, so as to construct a target three-dimensional human body model containing 6890 model vertices. In an embodiment, the server sends model data of the target three-dimensional human body model to the terminal for rendering and display by the terminal.

In an embodiment, when the terminal has a three-dimensional human body model reconstruction function, the server sends the predicted shape parameter and the predicted pose parameter outputted by the models to the terminal, so that the terminal reconstructs and displays a three-dimensional human body model.

In summary, in this embodiment of this application, a sample picture containing a human body image is inputted into a pose parameter prediction model and a shape parameter prediction model respectively to obtain a predicted pose parameter and a predicted shape parameter; a three-dimensional human body model is constructed based on the predicted pose parameter and the predicted shape parameter; a model prediction loss is calculated according to annotation information of the sample picture and at least one of the predicted pose parameter, the predicted shape parameter, or the three-dimensional human body model; and the pose parameter prediction model and the shape parameter prediction model are reversely trained according to the model prediction loss. When this method provided in the embodiments of this application is used to train a model, a sample picture is directly used as a model input for model training, and there is no need to separately train a model for extracting human body information in a picture, thereby reducing the complexity of model training and improving the efficiency of model training. In addition, the calculation of the model prediction loss according to annotation information, predicted parameters, and a three-dimensional human body model constructed based on the predicted parameters helps improve the training quality of the model, thereby improving the accuracy of predicted parameters.

Figure 11:
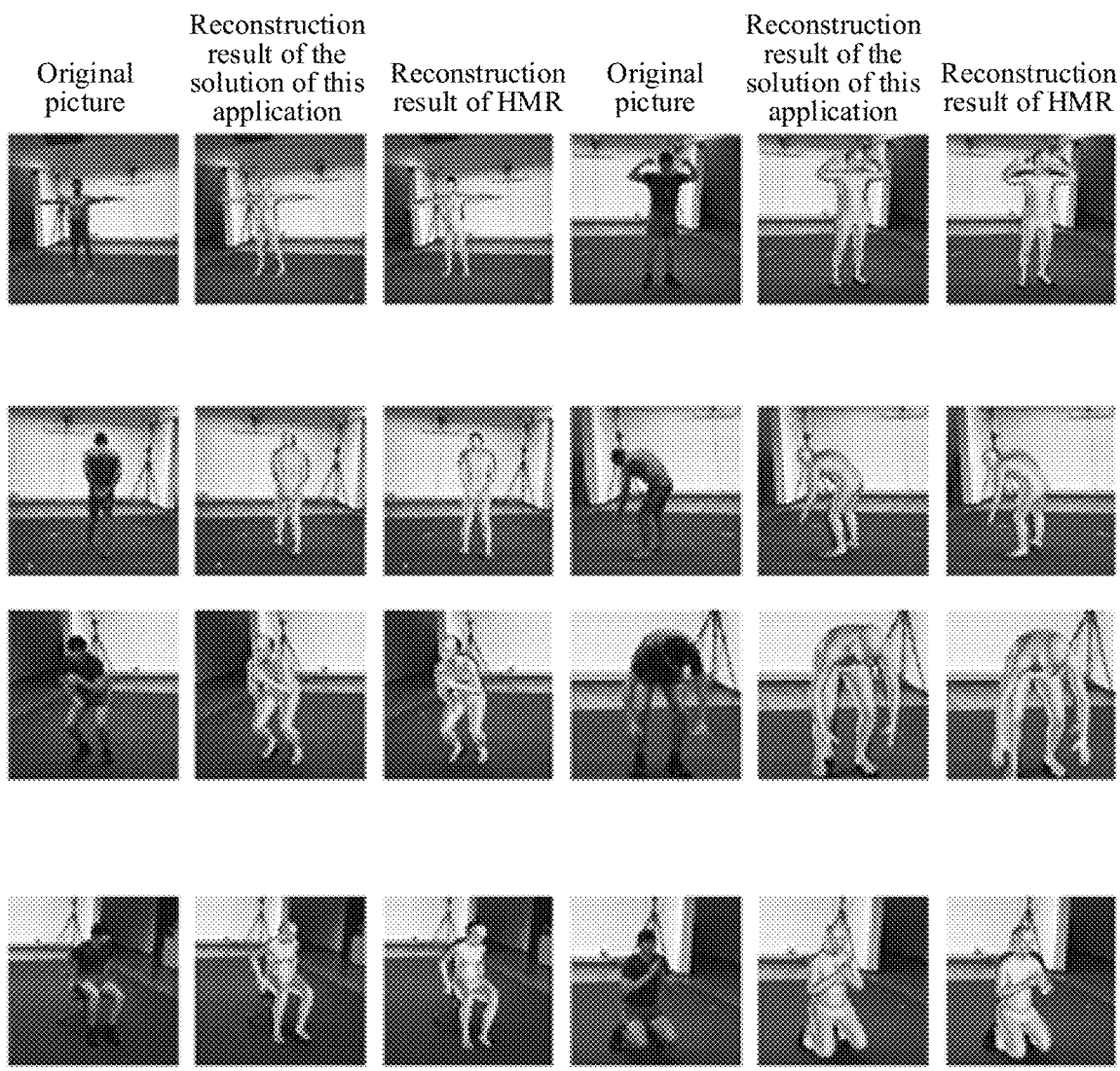
FIG. 11 and FIG. 12 show three-dimensional human body reconstruction results obtained by testing the solution provided by this application and the HMR solution by using a public data set.

The solution provided in this application and the world's leading human mesh recovery (HMR) solution were tested by using a public data set Human3.6M, with three-dimensional human body reconstruction results obtained being shown in FIG. 11. The solution provided in this application and the world's leading human mesh recovery (HMR) solution were tested by using a public data set UP (including UP-3D and UP-S1h), with three-dimensional human body reconstruction results obtained being shown in FIG. 12.

Figure 12:
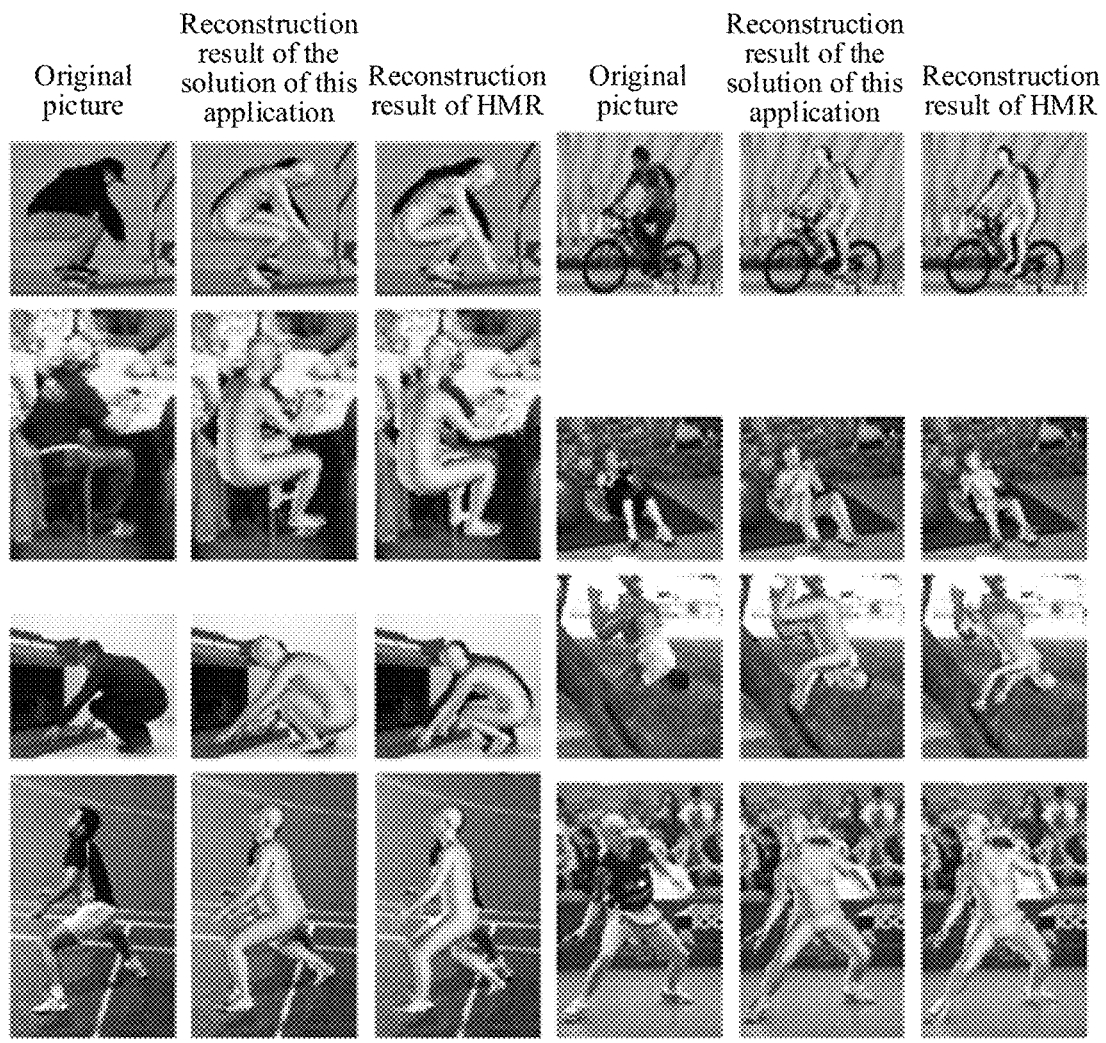

In addition, the three-dimensional human body reconstruction results shown in FIG. 11 and FIG. 12 were compared and analyzed against the human body image in the original picture. The analysis results obtained are shown in Table 3.

TABLE 3

| Solution | Accuracy (Acc) | F1-score | Procrustes analysis-mean per joint position error (mm) |
|---|---|---|---|
| HMR | 0.890 | 0.811 | 92.7 |
| Solution of this application | 0.900 | 0.856 | 88.9 |

Accuracy is used for measuring the degree of fitness between a reconstructed human body contour and an original human body contour, F1-score is used for indicating the accuracy and recall rate of the results, and Procrustes analysis—mean per joint position error (PA-MPVPE) is used for indicating a prediction error of a joint position.

From the analytical data in FIG. 11, FIG. 12, and Table 3, it can be learned that in three-dimensional human body reconstruction, compared with the HMR solution, the solution provided in this application features an improved accuracy and an increased recall rate of the reconstruction result, a higher degree of fitness between the reconstruction result and the human body image in the original picture, and a smaller joint position error, and the reconstruction effect has reached the world's leading level.

The following describes apparatus embodiments of this application, which can be used to execute the method embodiments of this application. For details not disclosed in the apparatus embodiments of this application, refer to the method embodiments of this application.

Figure 13:
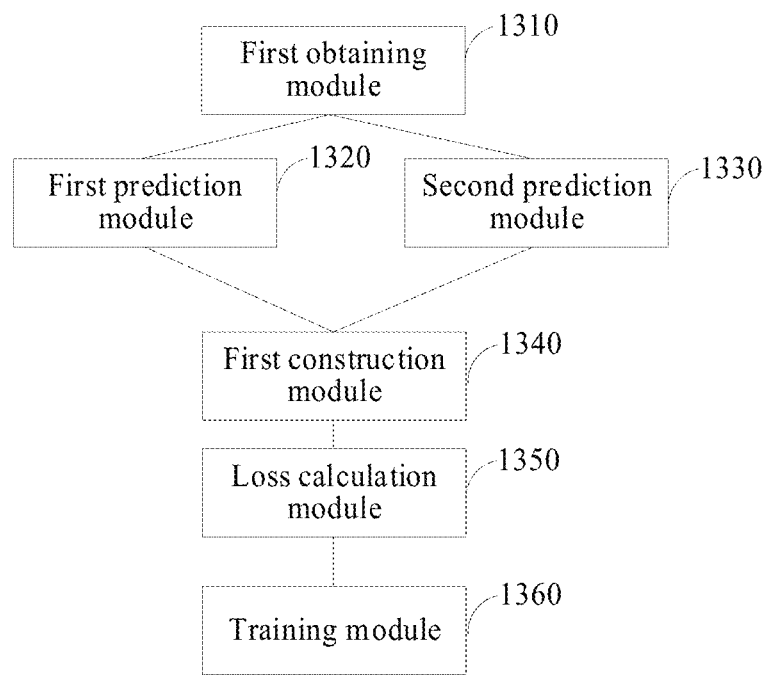
FIG. 13 is a block diagram of an apparatus for training an SMPL parameter prediction model according to an embodiment of this application.

FIG. 13 is a block diagram of an apparatus for training an SMPL parameter prediction model according to an embodiment of this application. The apparatus has functions of performing the foregoing method embodiments. The functions may be implemented by hardware, or may be implemented by hardware executing corresponding software. The apparatus may include:

a first obtaining module 1310, configured to obtain a sample picture, the sample picture containing a human body image;

a first prediction module 1320, configured to input the sample picture into a pose parameter prediction model to obtain a predicted pose parameter, the predicted pose parameter being a parameter used for indicating a human body pose in predicted SMPL parameters corresponding to the SMPL parameter prediction model;

a second prediction module 1330, configured to input the sample picture into a shape parameter prediction model to obtain a predicted shape parameter, the predicted shape parameter being a parameter used for indicating a human body shape in the predicted SMPL parameters corresponding to the SMPL parameter prediction model;

a first construction module 1340, configured to construct a three-dimensional human body model according to the predicted pose parameter and the predicted shape parameter;

a loss calculation module 1350, configured to calculate the model prediction losses according to the predicted SMPL parameters and/or the three-dimensional human body model in combination with annotation information of the sample picture; and a training module 1360, configured to reversely train the pose parameter prediction model and the shape parameter prediction model according to the model prediction losses.

In an embodiment, the loss calculation module 1350 includes:

a first calculation unit, configured to calculate the first model prediction loss according to the predicted SMPL parameters and annotated SMPL parameters in the annotation information, the annotated SMPL parameters including an annotated pose parameter and an annotated shape parameter;

and/or a second calculation unit, configured to calculate the second model prediction loss according to predicted joint coordinates of joints in the three-dimensional human body model and annotated joint coordinates of joints in the annotation information;

and/or a third calculation unit, configured to calculate the third model prediction loss according to a predicted two-dimensional human body contour of the three-dimensional human body model and an annotated two-dimensional human body contour in the annotation information.

In an embodiment, the first calculation unit is configured to:

calculate a first Euclidean distance between the annotated pose parameter and the predicted pose parameter;

calculate a second Euclidean distance between the annotated shape parameter and the predicted shape parameter; and determine the first model prediction loss according to the first Euclidean distance and the second Euclidean distance.

In an embodiment, the annotated joint coordinates include three-dimensional annotated joint coordinates and/or two-dimensional annotated joint coordinates; and the second calculation unit is configured to:

calculate third Euclidean distances between three-dimensional predicted joint coordinates of the joints in the three-dimensional human body model and the three-dimensional annotated joint coordinates;

calculate fourth Euclidean distances between two-dimensional predicted joint coordinates of the joints in the three-dimensional human body model and the two-dimensional annotated joint coordinates; and calculate the second model prediction loss according to the third Euclidean distances and/or the fourth Euclidean distances.

In an embodiment, the second calculation unit is further configured to:

determine the three-dimensional predicted joint coordinates of the joints in the three-dimensional human body model according to vertex coordinates of model vertices around the joints in the three-dimensional human body model; and calculate the third Euclidean distances between the three-dimensional predicted joint coordinates and the three-dimensional annotated joint coordinates.

In an embodiment, the pose parameter prediction model is further configured to output a projection parameter according to the inputted sample picture, the projection parameter being used for projecting points in a three-dimensional space into a two-dimensional space; and the second calculation unit is further configured to:

determine the three-dimensional predicted joint coordinates of the joints in the three-dimensional human body model according to vertex coordinates of model vertices around the joints in the three-dimensional human body model;

perform projection processing on the three-dimensional predicted joint coordinates according to the projection parameter to obtain the two-dimensional predicted joint coordinates; and calculate the fourth Euclidean distances between the two-dimensional predicted joint coordinates and the two-dimensional annotated joint coordinates.

In an embodiment, the pose parameter prediction model is further configured to output a projection parameter according to the inputted sample picture, the projection parameter being used for projecting points in a three-dimensional space into a two-dimensional space; and the third calculation unit is configured to:

project model vertices in the three-dimensional human body model into a two-dimensional space according to the projection parameter, and generate the predicted two-dimensional human body contour;

calculate a first contour loss and a second contour loss according to the predicted two-dimensional human body contour and the annotated two-dimensional human body contour; and determine the third model prediction loss according to the first contour loss and the second contour loss.

In an embodiment, the third calculation unit is configured to:

calculate a first shortest distance from each contour point in the predicted two-dimensional human body contour to the annotated two-dimensional human body contour, calculate the first contour loss according to the first shortest distance corresponding to each contour point in the predicted two-dimensional human body contour; and calculate a second shortest distance from each contour point in the annotated two-dimensional human body contour to the predicted two-dimensional human body contour, and calculate the second contour loss according to the second shortest distance corresponding to each contour point in the annotated two-dimensional human body contour.

In an embodiment, the third calculation unit is configured to:

determine a first weight of the contour point corresponding to each model vertex according to visibility of the joint to which the each model vertex in the three-dimensional human body model belongs; and calculate the first contour loss according to the first weight and the first shortest distance corresponding to each contour point in the predicted two-dimensional human body contour, where in a case that the joint to which a model vertex belongs is visible, the first weight of the contour point corresponding to the model vertex is 1; in a case that the joint to which a model vertex belongs is invisible, the first weight of the contour point corresponding to the each model vertex is 0.

In an embodiment, the third calculation unit is configured to determine the predicted joint coordinates of the joint to which each model vertex in the three-dimensional human body model belongs;

determine a second weight of the contour point corresponding to each model vertex according to a fifth Euclidean distance between the predicted joint coordinates and the annotated joint coordinates, the second weight and the fifth Euclidean distance having a negative correlation; and calculate the first contour loss according to the second weight and the first shortest distance corresponding to the each contour point in the predicted two-dimensional human body contour.

In an embodiment, the apparatus further includes:

a regular loss module, configured to perform regularization on the predicted shape parameter to obtain a fourth model prediction loss; and the training module 1360 is further configured to:

reversely train the pose parameter prediction model and the shape parameter prediction model according to the fourth model prediction loss.

Figure 14:
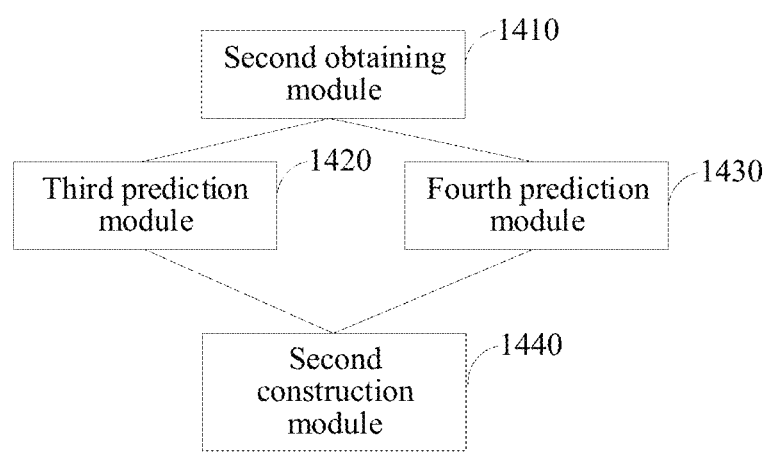
FIG. 14 is a block diagram of a three-dimensional human body reconstruction apparatus according to an embodiment of this application.

FIG. 14 is a block diagram of a three-dimensional human body reconstruction apparatus according to an embodiment of this application. The apparatus has functions of performing the foregoing method embodiments. The functions may be implemented by hardware, or may be implemented by hardware executing corresponding software. The apparatus may include:

a second obtaining module 1410, configured to obtain a target picture, the target picture containing a human body image;

a third prediction module 1420, configured to input the target picture into a pose parameter prediction model to obtain a predicted pose parameter, the predicted pose parameter being a parameter used for indicating a human body pose in predicted SMPL parameters corresponding to the SMPL parameter prediction model;

a fourth prediction module 1430, configured to input the target picture into a shape parameter prediction model to obtain a predicted shape parameter, the predicted shape parameter being a parameter used for indicating a human body shape in the predicted SMPL parameters corresponding to the SMPL parameter prediction model; and a second construction module 1440, configured to construct a target three-dimensional human body model according to the predicted pose parameter and the predicted shape parameter.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 15:
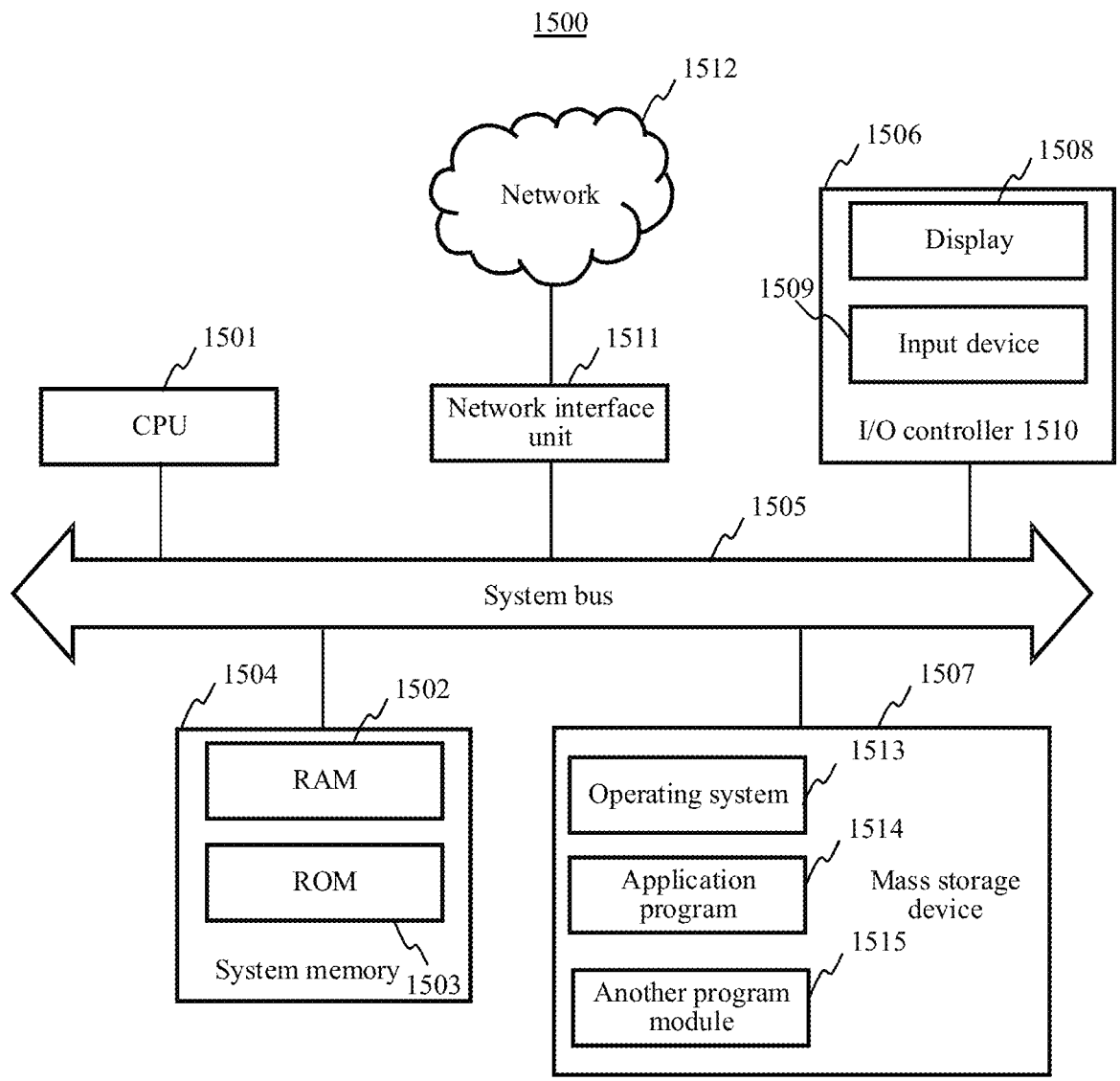
FIG. 15 is a schematic structural diagram of a computer device according to an embodiment of this application.

FIG. 15 is a schematic structural diagram of a computer device according to an embodiment of this application. The computer device is configured to implement the method for training an SMPL parameter prediction model or the three-dimensional human body reconstruction method provided in the foregoing embodiments. Specifically:

The computer device 1500 includes a central processing unit (CPU) 1501, a system memory 1504 including a random access memory (RAM) 1502 and a read-only memory (ROM) 1503, and a system bus 1505 connecting the system memory 1504 and the CPU 1501. The server 1500 further includes a basic input/output system (I/O system) 1506 for transmitting information between components in a computer, and a mass storage device 1507 used for storing an operating system 1513, an application program 1514, and another program module 1515.

The basic I/O system 1506 includes a display 1508 configured to display information and an input device 1509 such as a mouse or a keyboard that is configured to allow a user to input information. The display 1508 and the input device 1509 are both connected to the CPU 1501 by using an input/output controller 1510 connected to the system bus 1505. The basic I/O system 1506 may further include the input/output controller 1510, to receive and process inputs from a plurality of other devices, such as the keyboard, the mouse, or an electronic stylus. Similarly, the input/output controller 1510 further provides an output to a display screen, a printer or another type of an output device.

The large-capacity storage device 1507 is connected to the CPU 1501 by using a large-capacity storage controller (not shown) connected to the system bus 1505. The mass storage device 1507 and an associated computer-readable medium provide non-volatile storage for the computer device 1500. That is, the mass storage device 1507 may include a computer readable medium (not shown), such as a hard disk or a CD-ROM drive.

Without loss of generality, the computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. Certainly, a person skilled in the art may learn that the computer storage medium is not limited to the foregoing several types. The system memory 1504 and the mass storage device 1507 may be collectively referred to as a memory.

According to the various embodiments of this application, the computer device 1500 may further be connected, through a network such as the Internet, to a remote computer on the network for running. That is, the server 1500 may be connected to a network 1512 by using a network interface unit 1511 connected to the system bus 1505, or may be connected to another type of network or a remote computer system by using a network interface unit 1511.

The memory stores at least one instruction, at least one section of program, a code set, or an instruction set, and the at least one instruction, the at least one section of program, the code set, or the instruction set is configured to be executed by one or more processors to implement the functions of the steps of the method for training an SMPL parameter prediction model or the functions of the steps of the three-dimensional human body reconstruction method.

A non-transitory computer-readable storage medium is further provided in the embodiments of this application, the storage medium storing at least one instruction, at least one section of program, a code set, or an instruction set, and the at least one instruction, the at least one section of program, the code set, or the instruction set being loaded and executed by a processor to implement the method for training an SMPL parameter prediction model or the three-dimensional human body reconstruction method provided in the foregoing embodiments.

Optionally, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for the convenience of description, and do not imply the preference among the embodiments.

What is claimed is:

1. A method for training a skinned multi-person linear model (SMPL) parameter prediction model, performed by a computer device, the method comprising:
    obtaining a sample picture, the sample picture containing a human body image;
    inputting the sample picture into a pose parameter prediction model to obtain a predicted pose parameter, the predicted pose parameter being a parameter used for indicating a human body pose in the SMPL parameter prediction model;
    inputting the sample picture into a shape parameter prediction model to obtain a predicted shape parameter, the predicted shape parameter being a parameter used for indicating a human body shape in the SMPL parameter prediction model;
    constructing a three-dimensional human body model according to the predicted pose parameter and the predicted shape parameter;
    calculating model prediction losses according to the three-dimensional human body model based on the SMPL parameter prediction model and annotation information of the sample picture; and
    reversely training the pose parameter prediction model and the shape parameter prediction model the according to the model prediction losses.

2. The method according to claim 1, wherein the model prediction losses comprise a first model prediction loss; and the calculating model prediction losses according to the three-dimensional human body model based on the SMPL parameter prediction model and annotation information of the sample picture comprises:
    calculating the first model prediction loss according to the three-dimensional human body model based on the SMPL parameter prediction model and annotated SMPL parameters in the annotation information, the annotated SMPL parameters comprising an annotated pose parameter and an annotated shape parameter.

3. The method according to claim 2, wherein the calculating the first model prediction loss according to the three-dimensional human body model based on the SMPL parameter prediction model and annotated SMPL parameters in the annotation information comprises:
    calculating a first Euclidean distance between the annotated pose parameter and the predicted pose parameter;
    calculating a second Euclidean distance between the annotated shape parameter and the predicted shape parameter; and
    determining the first model prediction loss according to the first Euclidean distance and the second Euclidean distance.

4. The method according to claim 1, wherein the model prediction losses comprise a second model prediction loss; and the calculating the model prediction losses according to the three-dimensional human body model based on the SMPL parameter prediction model and the annotation information of the sample picture comprises:
    calculating the second model prediction loss according to predicted joint coordinates of joints in the three-dimensional human body model and annotated joint coordinates of joints in the annotation information.

5. The method according to claim 4, wherein the annotated joint coordinates comprise three-dimensional annotated joint coordinates and/or two-dimensional annotated joint coordinates; and
    the calculating the second model prediction loss according to predicted joint coordinates of joints in the three-dimensional human body model and annotated joint coordinates of joints in the annotation information comprises:
    calculating third Euclidean distances between three-dimensional predicted joint coordinates of the joints in the three-dimensional human body model and the three-dimensional annotated joint coordinates; and
    calculating the second model prediction loss according to the third Euclidean distances.

6. The method according to claim 5, wherein the calculating third Euclidean distances between three-dimensional predicted joint coordinates of the joints in the three-dimensional human body model and the three-dimensional annotated joint coordinates comprises:
    determining the three-dimensional predicted joint coordinates of the joints in the three-dimensional human body model according to vertex coordinates of model vertices around the joints in the three-dimensional human body model; and
    calculating the third Euclidean distances between the three-dimensional predicted joint coordinates and the three-dimensional annotated joint coordinates.

7. The method according to claim 5, wherein the calculating the second model prediction loss according to the third Euclidean distances comprises:
    calculating fourth Euclidean distances between two-dimensional predicted joint coordinates of the joints in the three-dimensional human body model and the two-dimensional annotated joint coordinates; and
    calculating the second model prediction loss according to the fourth Euclidean distances.

8. The method according to claim 7, wherein the pose parameter prediction model is further configured to output a projection parameter according to the inputted sample picture, the projection parameter being used for projecting points in a three-dimensional space into a two-dimensional space; and
    the calculating fourth Euclidean distances between two-dimensional predicted joint coordinates of the joints in the three-dimensional human body model and the two-dimensional annotated joint coordinates comprises:
    determining the three-dimensional predicted joint coordinates of the joints in the three-dimensional human body model according to vertex coordinates of model vertices around the joints in the three-dimensional human body model;

performing projection processing on the three-dimensional predicted joint coordinates according to the projection parameter to obtain the two-dimensional predicted joint coordinates; and calculating the fourth Euclidean distances between the two-dimensional predicted joint coordinates and the two-dimensional annotated joint coordinates.

9. The method according to claim 1, wherein the model prediction losses comprise a third model prediction loss; and the calculating the model prediction losses according to the three-dimensional human body model based on the SMPL parameter prediction model and the annotation information of the sample picture comprises:

calculating the third model prediction loss according to a predicted two-dimensional human body contour of the three-dimensional human body model and an annotated two-dimensional human body contour in the annotation information.

10. The method according to claim 9, wherein the pose parameter prediction model is further configured to output a projection parameter according to the inputted sample picture, the projection parameter being used for projecting points in a three-dimensional space into a two-dimensional space; and the calculating the third model prediction loss according to a predicted two-dimensional human body contour of the three-dimensional human body model and an annotated two-dimensional human body contour in the annotation information comprises:

projecting model vertices in the three-dimensional human body model into a two-dimensional space according to the projection parameter, and generating the predicted two-dimensional human body contour;

calculating a first contour loss and a second contour loss according to the predicted two-dimensional human body contour and the annotated two-dimensional human body contour; and determining the third model prediction loss according to the first contour loss and the second contour loss.

11. The method according to claim 10, wherein the calculating a first contour loss and a second contour loss according to the predicted two-dimensional human body contour and the annotated two-dimensional human body contour comprises:

calculating a first shortest distance from each contour point in the predicted two-dimensional human body contour to the annotated two-dimensional human body contour, and calculating the first contour loss according to the first shortest distance corresponding to each contour point in the predicted two-dimensional human body contour; and calculating a second shortest distance from each contour point in the annotated two-dimensional human body contour to the predicted two-dimensional human body contour, and calculating the second contour loss according to the second shortest distance corresponding to each contour point in the annotated two-dimensional human body contour.

12. The method according to claim 11, wherein the calculating the first contour loss according to the first shortest distance corresponding to each contour point in the predicted two-dimensional human body contour comprises:

determining a first weight of the contour point corresponding to each model vertex according to visibility of the joint to which the each model vertex in the three-dimensional human body model belongs; and calculating the first contour loss according to the first weight and the first shortest distance corresponding to each contour point in the predicted two-dimensional human body contour, wherein in a case that the joint to which a model vertex belongs is visible, the first weight of the contour point corresponding to the model vertex is 1; and in a case that the joint to which a model vertex belongs is invisible, the first weight of the contour point corresponding to the model vertex is 0.

13. The method according to claim 11, wherein the calculating the first contour loss according to the first shortest distance corresponding to each contour point in the predicted two-dimensional human body contour comprises:

determining the predicted joint coordinates of the joint to which each model vertex in the three-dimensional human body model belongs;

determining a second weight of the contour point corresponding to each model vertex according to a fifth Euclidean distance between the predicted joint coordinates and the annotated joint coordinates, the second weight and the fifth Euclidean distance having a negative correlation; and calculating the first contour loss according to the second weight and the first shortest distance corresponding to each contour point in the predicted two-dimensional human body contour.

14. The method according to claim 1, further comprising:

performing regularization on the predicted shape parameter to obtain a fourth model prediction loss; and updating the pose parameter prediction model and the shape parameter prediction model according to the fourth model prediction loss.

15. The method according to claim 1, comprising:

obtaining a target picture, the target picture containing a human body image;

inputting the target picture into the updated pose parameter prediction model to obtain a predicted pose parameter;

inputting the target picture into the updated shape parameter prediction model to obtain a predicted shape parameter; and constructing a target three-dimensional human body model according to the predicted pose parameter and the predicted shape parameter.

16. A computer device, comprising a processor and a memory, the memory storing a plurality of instructions that, when executed by the processor, cause the computer device to perform a plurality of operations including:

obtaining a sample picture, the sample picture containing a human body image;

inputting the sample picture into a pose parameter prediction model to obtain a predicted pose parameter, the predicted pose parameter being a parameter used for indicating a human body pose in the SMPL parameter prediction model;

inputting the sample picture into a shape parameter prediction model to obtain a predicted shape parameter, the predicted shape parameter being a parameter used for indicating a human body shape in the SMPL parameter prediction model;

constructing a three-dimensional human body model according to the predicted pose parameter and the predicted shape parameter;

calculating model prediction losses according to the three-dimensional human body model based on the SMPL parameter prediction model and annotation information of the sample picture; and reversely training the pose parameter prediction model and the shape parameter prediction model according to the model prediction losses.

17. The computer device according to claim 16, wherein the plurality of operations further comprise:

obtaining a target picture, the target picture containing a human body image;

inputting the target picture into the updated pose parameter prediction model to obtain a predicted pose parameter;

inputting the target picture into the updated shape parameter prediction model to obtain a predicted shape parameter; and constructing a target three-dimensional human body model according to the predicted pose parameter and the predicted shape parameter.

18. A non-transitory computer-readable storage medium, storing a plurality of instructions that, when executed by a processor of a computer device, cause the computer device to perform a plurality of operations including:

obtaining a sample picture, the sample picture containing a human body image;

inputting the sample picture into a pose parameter prediction model to obtain a predicted pose parameter, the predicted pose parameter being a parameter used for indicating a human body pose in the SMPL parameter prediction model;

inputting the sample picture into a shape parameter prediction model to obtain a predicted shape parameter, the predicted shape parameter being a parameter used for indicating a human body shape in the SMPL parameter prediction model;

constructing a three-dimensional human body model according to the predicted pose parameter and the predicted shape parameter;

calculating model prediction losses according to the three-dimensional human body model based on the SMPL parameter prediction model and annotation information of the sample picture; and reversely training the pose parameter prediction model and the shape parameter prediction model according to the model prediction losses.

19. The non-transitory computer-readable storage medium according to claim 18, wherein the plurality of operations further comprise:

obtaining a target picture, the target picture containing a human body image;

inputting the target picture into the updated pose parameter prediction model to obtain a predicted pose parameter;

inputting the target picture into the updated shape parameter prediction model to obtain a predicted shape parameter; and constructing a target three-dimensional human body model according to the predicted pose parameter and the predicted shape parameter.

* * * * *